United States Patent
Miyaki

(10) Patent No.: US 7,126,896 B2
(45) Date of Patent: Oct. 24, 2006

(54) INFORMATION RECORDING METHOD, RECORDING CONDITION DETECTION METHOD, AND INFORMATION RECORDING APPARATUS

(75) Inventor: Seiichiro Miyaki, Tokyo (JP)

(73) Assignee: NEC Corporation, Tokyo (JP)

( * ) Notice: Subject to any disclaimer, the term of this patent is extended or adjusted under 35 U.S.C. 154(b) by 509 days.

(21) Appl. No.: 10/383,353

(22) Filed: Mar. 7, 2003

(65) Prior Publication Data

US 2003/0169659 A1 Sep. 11, 2003

(30) Foreign Application Priority Data

Mar. 7, 2002 (JP) .............................. 2002-061306

(51) Int. Cl.
*G11B 7/00* (2006.01)
*G11B 5/09* (2006.01)

(52) U.S. Cl. .............................. 369/47.53; 369/47.51; 369/53.11

(58) Field of Classification Search ...................... None
See application file for complete search history.

(56) References Cited

U.S. PATENT DOCUMENTS 6,246,660 B1 * 6/2001 Yanagawa .................. 369/116
6,515,949 B1 * 2/2003 Masaki et al. ........... 369/53.11
6,580,672 B1 * 6/2003 Hattori et al. ........... 369/53.22
2002/0031060 A1 * 3/2002 Mashimo et al. ........ 369/44.29
2002/0101805 A1 * 8/2002 Ishiwata et al. ......... 369/47.51
2002/0101806 A1 * 8/2002 Miyaki .................... 369/47.53

FOREIGN PATENT DOCUMENTS

| JP | 09-091705 | 4/1997 |
|---|---|---|
| JP | 09-270128 | 10/1997 |
| JP | 2000-215454 | 8/2000 |
| JP | 2001-18260 | 1/2001 |

* cited by examiner

*Primary Examiner*—Trang V. Tran
*Assistant Examiner*—Tawfik Goma
(74) *Attorney, Agent, or Firm*—Scully, Scott, Murphy & Presser, P.C.

(57) ABSTRACT

A plurality of pits representing recording target information are formed on an optical disk, while a laser light having a predetermined power is irradiated onto the optical disk. When information is being recorded, a condition index representing a recording condition of the optical disk is derived with the use of an equation which is changeable in accordance with the kind of the optical disk and the operational environment of a recording apparatus. The power of the laser light irradiated onto the optical disk is adjusted so that the recording condition may be a predetermined recording condition based on the derived condition index.

22 Claims, 10 Drawing Sheets

INFORMATION RECORDING METHOD, RECORDING CONDITION DETECTION METHOD, AND INFORMATION RECORDING APPARATUS

BACKGROUND OF THE INVENTION

1. Field of the Invention

The present invention relates to an information recording method, a recording condition detection method, and an information recording apparatus.

2. Description of the Related Art

A recording condition of an optical disk is represented by two parameters, namely, "asymmetry" and "β".

Each of "asymmetry" and "β" represents an asymmetric characteristic of the waveform of a reproduction signal (RF (Radio Frequency) waveform) which is obtained when information recorded on an optical disk is reproduced.

"Asymmetry" is derived from a reproduction signal obtained by DC (direct-current) coupling, whereas "β" is derived from a reproduction signal obtained by AC (alternating-current) coupling.

A recording apparatus for recording information on an optical disk changes the power of a laser light irradiated on the optical disk in accordance with a digital signal obtained by EFM (Eight to Fourteen Modulation). Due to this, a plurality of pits representing information to be recorded are formed on the optical disk.

The time width (pulse width) of the high level and the low level of the aforementioned digital signal is generally regulated to three times to eleven times as large as a predetermined reference time width T.

Since the recording apparatus changes the power of a laser light in accordance with pulse widths 3T to 11T, the lengths of pits to be formed also vary in accordance with the pulse widths 3T to 11T.

FIGS. 1A and 1B respectively show waveforms of reproduction signals obtained from pits having lengths corresponding to the aforementioned pulse widths 3T to 11T. Specifically, FIG. 1A is a diagram showing waveforms of reproduction signals (HF (High Frequency) signals) obtained by DC coupling, and FIG. 1B is a diagram showing waveforms of reproduction signals (HF signals) obtained by AC coupling.

As shown in FIGS. 1A and 1B, the frequencies and amplitudes of the reproduction signals vary in accordance with the lengths of the pits. For example, the amplitude of a reproduction signal obtained from a pit having the length of 3T (the shortest pit) is the smallest, while the amplitude of a reproduction signal obtained from a pit having the length of 11T (the longest pit) is the largest.

Let it be assumed in FIG. 1A that the local maximum level of the reproduction signal of 3T is $I_{3L}$ and the local minimum level thereof is $I_{3P}$, and the local maximum level of the reproduction signal of 11T is $I_{11L}$ and the local minimum level thereof is $I_{11P}$. In this case, the "asymmetry" is represented by the equation (1) below.

$$\text{Asymmetry} = \{(I_{3L}+I_{3P})/2 - (I_{11L}+I_{11P})/2\}/(I_{11L}-I_{11P}) \quad (1)$$

Further, let it be assumed in FIG. 1B that AC-GND is zero level, the maximum level (land level) of the waveform envelopes is A1, and the minimum level (pit level) of the waveform envelopes is A2. In this case, "β" is represented by the equation (2) below.

$$\beta = (A1+A2)/(A1-A2) \quad (2)$$

There is a relationship shown in FIG. 2 between the parameter β (asymmetry) and jitter, for example.

As shown in FIG. 2, when the value of β is extremely large or extremely small, the jitter value becomes large.

The value range of β in which jitter values are equal to or smaller than a tolerable level is generally called "power margin". The power margin varies in accordance with the kinds of optical disks.

In a case where information is to be recorded on an optical disk having a narrow power margin, the information must be recorded such that the values of β become uniform.

When recording information, experimental writing is first performed in a PCA (Power Calibration Area) prepared on the optical disk, in order to perform so-called OPC (Optimum Power Calibration). As a result, the power of a laser light that realizes the optimum recording condition (optimum power) is derived.

Afterwards, the information to be recorded is recorded on the data recording area prepared on the optical disk, by the optimum power derived by the OPC.

However, although the information is recorded by the optimum power derived by the OPC, there are some cases where the recording condition can not be kept optimum, due to various causes described below.

Such causes are, for example:

(a) changes in the property inside the optical disk;

(b) changes in the angle between the optical axis of the laser light and the recording surface of the optical disk, caused by radial skews, warping of the disk, etc.;

(c) changes in the property of the optical disk, due to changes in the temperature between the time of performing the OPC and the time of recording information; and (d) changes in the wavelength of the laser light, due to changes in the characteristic of a semiconductor element which emits the laser light, caused by changes in the temperature between the time of performing the OPC and the time of recording information.

As one method for solving the above described problems, there is a method called "running OPC". The running OPC is for keeping the optimum recording condition, by detecting the recording condition even while information is recorded and by correcting the power of the laser light irradiated on the optical disk based on the detected recording condition.

Such a method for detecting the recording condition during information recording is disclosed in, for example, Unexamined Japanese Patent Application KOKAI Publication No. 2000-215454 (Publication 1), Unexamined Japanese Patent Application KOKAI Publication No. H9-270128 (Publication 2), and Unexamined Japanese Patent Application KOKAI Publication No. H9-91705 (Publication 3).

The technique disclosed in Publication 1 derives the recording condition during information recording, using the equation (3) below.

$$\text{Recording condition} = (B \text{ value})/(\text{PEAK value}) \quad (3)$$

B value: the minimum intensity of a reflection light from an area where a pit is to be formed during information recording PEAK value: the maximum intensity of a reflection light from the area where a pit is to be formed during information recording The technique disclosed in Publication 2 derives the recording condition during information recording, using the equation (4) below.

$$\text{Recording condition} = Am/N - Bm \quad (4)$$

Am: the average of the maximum intensities of reflection lights from the areas where pits are to be formed N: a constant corresponding to the kind of the optical disk Bm: the average of the intensities of reflection lights which are observed when the reference time width T passes from the points from which the respective pits are to be formed The technique disclosed in Publication 3 derives the recording condition during information recording, using the equation (5) below.

$$\text{Recording condition} = Vp/P1 \tag{5}$$

Vp: the level of a reflection light from the area where a pit is to be formed during information recording P1: the power of the laser light for forming pits However, the techniques disclosed in Publications 1, 2, and 3 are not able to keep the optimum recording condition derived by the OPC throughout the information recording in some cases.

Specifically, when the kinds of the optical disks are changed or operational environments of the recording apparatus are changed, the recording condition may not be represented correctly by the equations (3), (4), and (5). Therefore, the recording condition might be changed even when the running OPC is performed by using the equations (3), (4), and (5).

The techniques disclosed in Publications 1, 2, and 3 do not at all take into consideration the fact that the most appropriate calculation required to derive the recording condition is different depending on the kinds of the optical disks and the operational environments of the recording apparatus. Therefore, there are some cases where the techniques disclosed in Publications 1, 2, and 3 can not keep the optimum recording condition derived by the OPC throughout the information recording.

The contents of Publications 1, 2, and 3 described above are incorporated herein by reference.

SUMMARY OF THE INVENTION

Accordingly, an object of the present invention is to provide an information recording method, a recording condition detection method, and an information recording apparatus capable of keeping the optimum recording condition while information is recorded.

To achieve the above object, an information recording method according to a first aspect of the present invention is an information recording method of recording information on an optical disk, comprising:

an information recording step of forming a plurality of pits representing recording target information on the optical disk by controlling a power of a laser light to be irradiated onto the optical disk;

condition detecting step of deriving a condition index representing a recording condition of the optical disk, while the laser light is irradiated onto the optical disk in the information recording step, by using an equation which is changeable in accordance with a kind of the optical disk and an environment in which information recording is performed; and a power adjusting step of adjusting the power of the laser light to be irradiated in the information recording step, in order that the recording condition may be a predetermined recording condition, based on the condition index derived in the condition detecting step.

According to this invention, an equation changeable in accordance with the kind of an optical disk and the environment in which information recording is performed, is used. Due to this, it is possible to maintain an optimum recording condition, even when the kind of an optical disk and the environment in which information recording is performed change.

The equation may include a coefficient which is determined in accordance with the kind of the optical disk and the environment in which information recording is performed.

The equation may be represented by $Rm = Sp/Ss/Pw1^{\gamma}$ (where Rm represents the condition index, Sp represents a level of a portion of a reflection light from the optical disk in case of a pit being formed, in which portion a light intensity is stable, Ss represents a level of a portion of a reflection light from the optical disk in case of a pit not being formed, in which portion a light intensity is stable, and $\gamma$ represents the coefficient determined in accordance with the kind of the optical disk and the environment in which information recording is performed).

In this case, the information recording method may further comprise: a first detecting step of detecting the level Sp; and a second detecting step of detecting the level Ss, and the condition detecting step may include a step of deriving the condition index Rm by using the detected levels Sp and Ss, and the equation, in a case where a velocity along tracks of the optical disk is constant.

The equation may be represented by $Rm = Sp/Ref/Pw1^{\gamma}$ (where Rm represents the condition index, Sp represents a level of a portion of a reflection light from the optical disk in case of a pit being formed, in which portion a light intensity is stable, Ref represents a reflection ratio of the optical disk, Pw1 represents a power of a laser light for forming a pit, and $\gamma$ represents the coefficient determined in accordance with the kind of the optical disk and environment in which information recording is performed).

In this case, the information recording method may further comprise a level detecting step of detecting the level Sp, and the condition detecting step may include a step of deriving the condition index Rm by using the detected level Sp and the equation, in a case where a velocity along tracks of the optical disk is constant.

The equation may be represented by $Rm = Sp/Pw1^{\gamma}$ (where Rm is the condition index, Sp represents a level of a portion of a reflection light from the optical disk in case of a pit being formed, in which portion a light intensity is stable, Pw1 represents a power of a laser light for forming a pit, and $\gamma$ represents the coefficient determined in accordance with the kind of the optical disk and the environment in which information recording is performed).

In this case, the information recording method may further comprise a level detecting step of detecting the level Sp, and the condition detecting step may include a step of deriving the condition index Rm by using the detected level Sp and the equation, in a case where a velocity along tracks of the optical disk is constant.

The equation may be represented by $Rm = Spk \times \alpha \times \gamma - Sp$ (where Rm represents the condition index, Spk represents a level of a portion of a reflection light from the optical disk in case of a pit being formed, in which portion a light intensity reaches a peak, $\alpha$ represents a correction coefficient for correcting the peak level, $\gamma$ represents the coefficient determined in accordance with the kind of the optical disk and the environment in which information recording is performed, and Sp represents a level of a portion of a reflection light from the optical disk in case of a pit being formed, in which portion a light intensity is stable).

In this case, the information recording method may further comprise: a peak detecting step of detecting the level Spk; and a level detecting step of detecting the level Sp, and the condition detecting step may include a step of deriving the condition index Rm by using the detected levels Spk and Sp, and the equation, in a case where a velocity along tracks of the optical disk is constant.

The equation may be represented by $Rm=(Spk\times\alpha\times\gamma-Sp)\times Pw1$ (where Rm represents the condition index, Spk represents a level of a portion of a reflection light from the optical disk in case of a pit being formed, in which portion a light intensity reaches a peak, $\alpha$ represents a correction coefficient for correcting the peak level, $\gamma$ represents the coefficient determined in accordance with the kind of the optical disk and the environment in which information recording is performed, Sp represent a level of a portion of a reflection light from the optical disk in case of a pit being formed, in which portion a light intensity is stable, and Pw1 represents a power of a laser light for forming a pit).

In this case, the information recording method may further comprise: a peak detecting step of detecting the level Spk; and a level detecting step of detecting the level Sp, and the condition detecting step may include a step of deriving the condition index Rm by using the detected levels Spk and Sp and the equation, in a case where a velocity along tracks of the optical disk is constant.

The equation may be represented by $Rm=(Spk\times\alpha\times\gamma-Sp)/Ss$ (Rm represents the condition index, Spk represents a level of a portion of a reflection light from the optical disk in case of a pit being formed, in which portion a light intensity reaches a peak, $\alpha$ represents a correction coefficient for correcting the peak level, $\gamma$ represents the coefficient determined in accordance with the kind of the optical disk and the environment in which information recording is performed, Sp represents a level of a portion of a reflection light from the optical disk in case of a pit being formed, in which portion a light intensity is stable, and Ss represents a level of a portion of a reflection light from the optical disk in case of a pit not being formed, in which portion a light intensity is stable).

In this case, the information recording method may further comprise: a peak detecting step of detecting the level Spk; a first level detecting step of detecting the level Sp; and a second level detecting step of detecting the level Ss, and the condition detecting step may include a step of deriving the condition index Rm by using the detected levels Spk, Sp, and Ss, and the equation, in a case where a velocity along tracks of the optical disk is constant.

The peak detecting step may include a step of deriving the level Spk by using an equation $Spk=Ss/Pr1\times Pw1$ or an equation $Spk\times\alpha=Ss/Pr1\times Pw1$ (where Pr1 represents a power of a laser light for forming no pit).

The condition detecting step may include a step of deriving the condition index Rm by using an equation $Rm=(Sp/Rp)/Ss/(Pw1/Rp)^{\gamma}$ (where Rp represents a ratio of power changes due to changes in a velocity along tracks of the optical disk), in a case where a rotation velocity of the optical disk is constant.

The condition detecting step may include a step of deriving the condition index Rm by using an equation $Rm=(Sp/Rp)/Ref/(Pw1/Rp)^{\gamma}$ (where Rp represents a ratio of power changes due to changes in a velocity along tracks of the optical disk), in a case where a rotation velocity of the optical disk is constant.

The condition detecting step may include a step of deriving the detection index Rm by using an equation $Rm=(Sp/Rp)/(Pw1/Rp)^{\gamma}$ (where Rp represents a ratio of power changes due to changes in a velocity along tracks of the optical disk), in a case where a rotation velocity of the optical disk is constant.

The condition detecting step may include a step of deriving the condition index Rm by using an equation $Rm=Spk\times\alpha\times\gamma-(Sp/Rp)$ (where Rp represents a ratio of power changes due to changes in a velocity along tracks of the optical disk), in a case where a rotation velocity of the optical disk is constant.

The condition detecting step may include a step of deriving the condition index Rm by using an equation $Rm=(Spk\times\alpha\times\gamma-Sp/Rp)\times Pw1/Rp$ (where Rp represents a ratio of power changes due to changes in a velocity along tracks of the optical disk), in a case where a rotation velocity of the optical disk is constant.

The condition detecting step may include a step of deriving the condition index Rm by using an equation $Rm=(Spk\times\alpha\times\gamma-Sp/Rp)/Ss$ (where Rp represents a ratio of power changes due to changes in a velocity along tracks of the optical disk), in a case where a rotation velocity of the optical disk is constant.

The peak detecting step may include a step of deriving the level Spk by using an equation $Spk=Ss/Pr1\times(Pw1/Rp)$ or an equation $Spk\times\alpha=Ss/Pr1\times(Pw1/Rp)$, in the case where the rotation velocity of the optical disk is constant.

The condition detecting step may include a step of deriving the power change ratio Rp by using an equation $Rp=\epsilon\times\sqrt{Lv}$ (where $\epsilon$ represents a proportionality constant, and Lv represents a velocity along tracks of the optical disk), in a case where a recording strategy is not changed.

In a case where a recording strategy is changed, the condition detecting step may include a step of deriving the power change ratio Rp by using an equation $Rp=\epsilon\times\sqrt{Lv}\times Rps$ (where $\epsilon$ represents a proportionality constant, Lv represents a velocity along tracks of the optical disk, and Rps represents a ratio of power changes due to changes in the recording strategy).

In a case where the coefficient $\gamma$ can be represented by an expression $\gamma=f/g$ (where f and g are integers), the condition detecting step may include a step of deriving a value obtained by raising the condition index Rm to the g-th power, as an index which represents the recording condition of the optical disk.

The condition detecting step may include a step of deriving an average of values of the condition index Rm, which can be derived while the optical disk makes at least one rotation, as an index representing the recording condition of the optical disk.

To achieve the above object, a condition detection method according to a second aspect of the present invention is a condition detection method of detecting a recording condition of an optical disk, comprising:

a level detecting step of detecting a level of a reflection light from the optical disk, while a laser light is irradiated onto the optical disk for information recording; and a condition detecting step of deriving a condition index representing the recording condition of the optical disk, by using the level detected in the level detecting step and an equation which is changeable in accordance with a kind of the optical disk and an environment in which information recording is performed.

The equation may include a coefficient which is determined in accordance with the kind of the optical disk and the environment in which information recording is performed.

To achieve the above object, an information recording apparatus according to a third aspect of the present invention is an information recording apparatus for recording information on an optical disk, comprising:

an irradiation unit which irradiates a laser light onto the optical disk;

a power control unit which forms a plurality of pits representing recording target information on the optical disk, by controlling a power of the laser light irradiated by the irradiation unit; and a condition detection unit which derives a condition index representing a recording condition of the optical disk, by using an equation which is changeable in accordance with a kind of the optical disk and an environment in which the information recording apparatus is operated, while the laser light is irradiated onto the optical disk, wherein the power control unit controls the power of the laser light so that the recording condition may be a predetermined recording condition, based on the condition index derived by the condition detection unit.

The equation may include a coefficient which is determined in accordance with the kind of the optical disk and the environment in which the information recording apparatus is operated.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An information recording method according to an embodiment of the present invention will now be explained with reference to the drawings.

According to the present embodiment, the running OPC is performed when information is recorded on an optical disk. First, a condition index Rm which represents a recording condition of an optical disk (or, a recording condition of the information recorded on the optical disk) and which is used in the running OPC of the present embodiment will be explained. Next, the structure of an optical disk device which performs the information recording method according to the present embodiment will be explained. After that, an operation of the optical disk device will be explained.

(A) Condition Index Rm

Figure 1A:
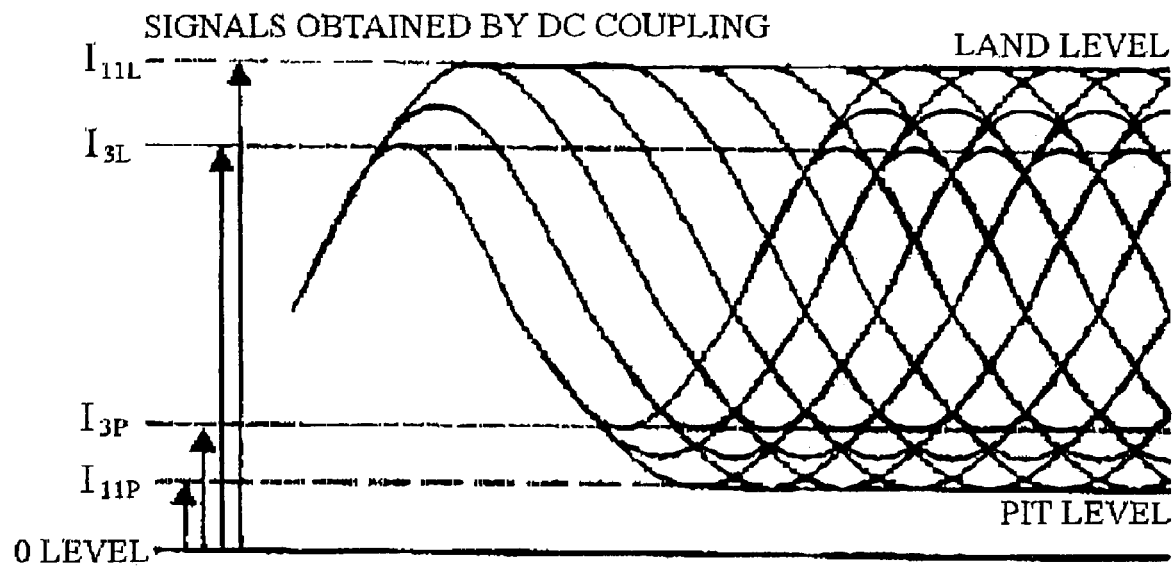
FIGS. 1A and 1B are diagrams showing waveforms of reproduction signals obtained from a plurality of pits having different lengths from one another.
Figure 1B:
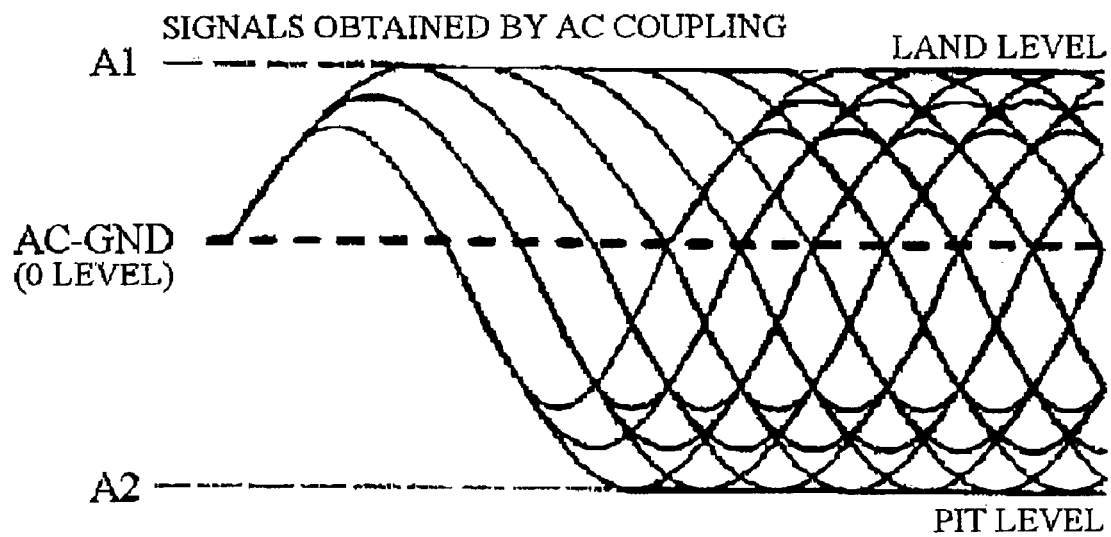
Figure 2:
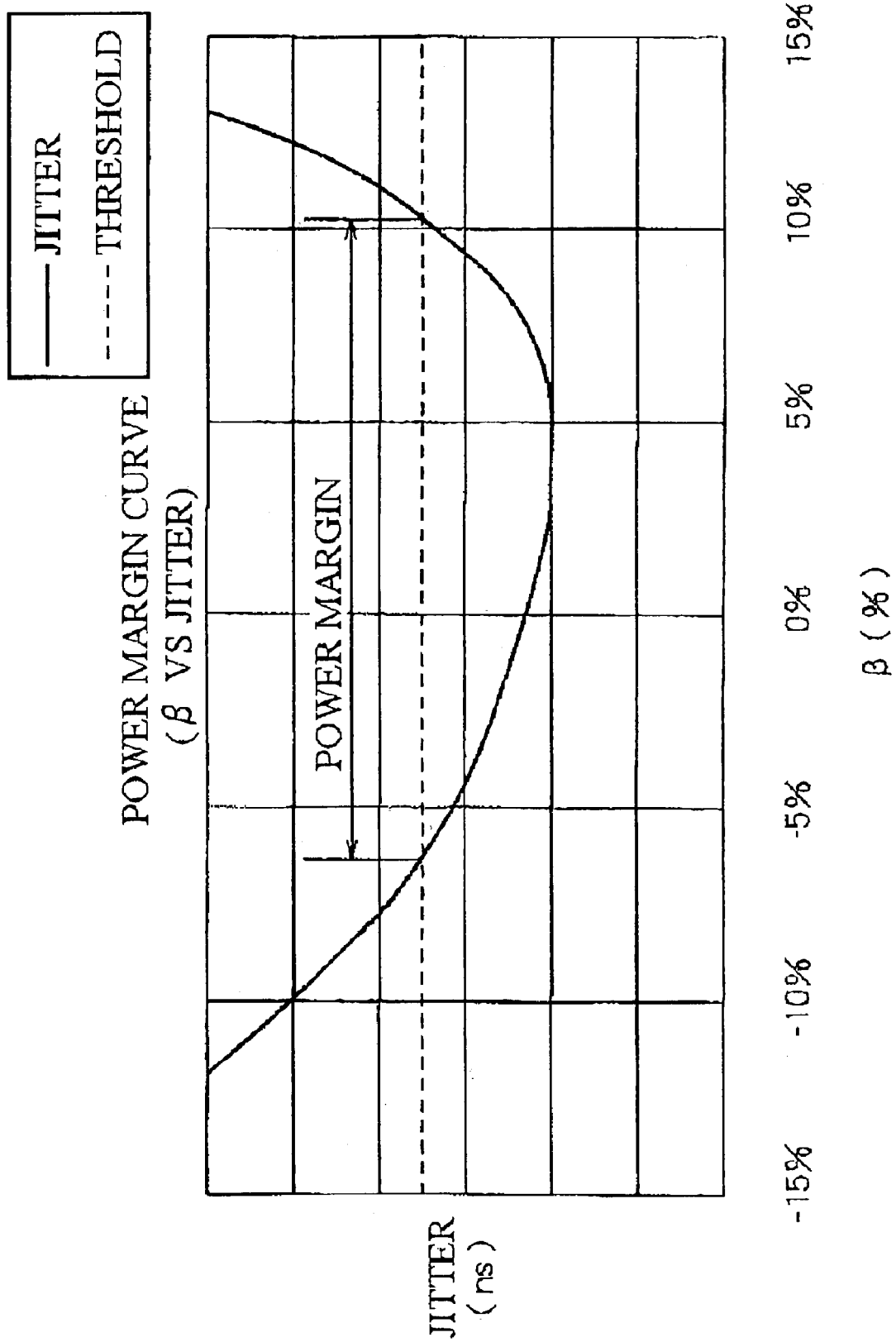
FIG. 2 is a diagram showing a relationship between a parameter β representing an asymmetric character of a reproduction signal and jitter.
Figure 3:
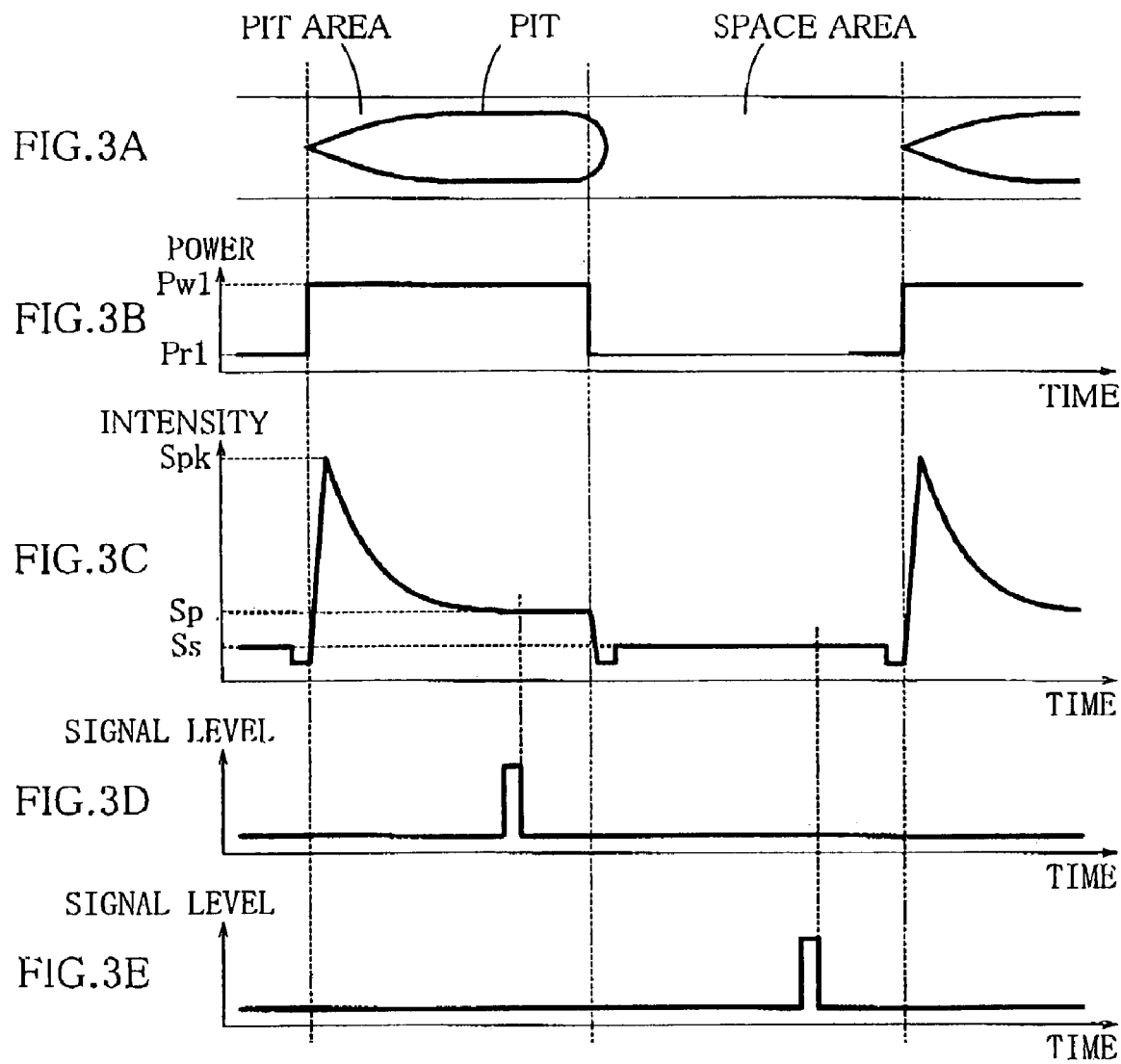
FIG. 3A is a diagram showing pits formed on an optical disk.
FIG. 3B is a diagram showing a power of a laser light irradiated onto an optical disk to form pits.
FIG. 3C is a diagram showing intensity of a reflection light from an optical disk.
FIG. 3D is a diagram showing a timing to sample a reflection light from a pit area.
FIG. 3E is a diagram showing a timing to sample a reflection light from a space area.

Information recorded on an optical disk is represented by a plurality of pits such as shown in FIG. 3A. The plurality of pits are formed by irradiating a laser light on the optical disk.

The power of the laser light to be irradiated is controlled in a manner shown in FIG. 3B, for example. FIG. 3B shows the power of a laser light emitted from an object lens set in front of a semiconductor element which emits the laser light.

As shown in FIG. 3B, a pit is formed when a laser light having a relatively high power Pw1 (a pit forming light) is irradiated. On the other hand, no pit is formed when a laser light having a relatively low power Pr1 (a no-pit forming light) is irradiated.

The laser light which has been irradiated reflects on the optical disk. The intensity of the reflection light changes as shown in FIG. 3C, for example.

As shown in FIG. 3C, a reflection light from a pit area where a pit is to be formed (a pit reflection light) becomes sharply strong immediately after irradiation of a pit forming light is started, and thereafter becomes weaker and stable. Such a change occurs because no pit is formed very after the irradiation of the pit forming light is started. The intensity of a reflection light from a space area between pits (a space reflection light) is almost constant as shown in FIG. 3C.

The condition index Rm representing a recording condition which is used during information recording (during the running OPC) is represented by the equation (6) below.

$$Rm = Sp/Ss/Pw1^{\gamma} \qquad (6)$$

Rm: condition index
Sp: stable level of a pit reflection light
Ss: level of a space reflection light
Pw1 power of a pit forming light
γ: sensitivity coefficient of running OPC The level Sp represents a level (intensity) at which the intensity of the aforementioned pit reflection light becomes stable, and is obtained by sampling performed at a timing shown in FIG. 3D, for example. The level Ss represents a level (intensity) of the aforementioned space reflection light, and is obtained by sampling performed at a timing shown in FIG. 3E, for example. As shown in FIGS. 3C to 3E, sampling of the levels Sp and Ss is performed where the intensities of the reflection lights become stable.

The sensitivity coefficient γ represents a degree of impact on the recording condition caused by the running OPC. The larger the value of the sensitivity coefficient γ is, the smaller the degree of impact is. The value of the sensitivity coefficient γ is set in accordance with kinds of optical disks and operational environments of the optical disk device.

Figure 4:
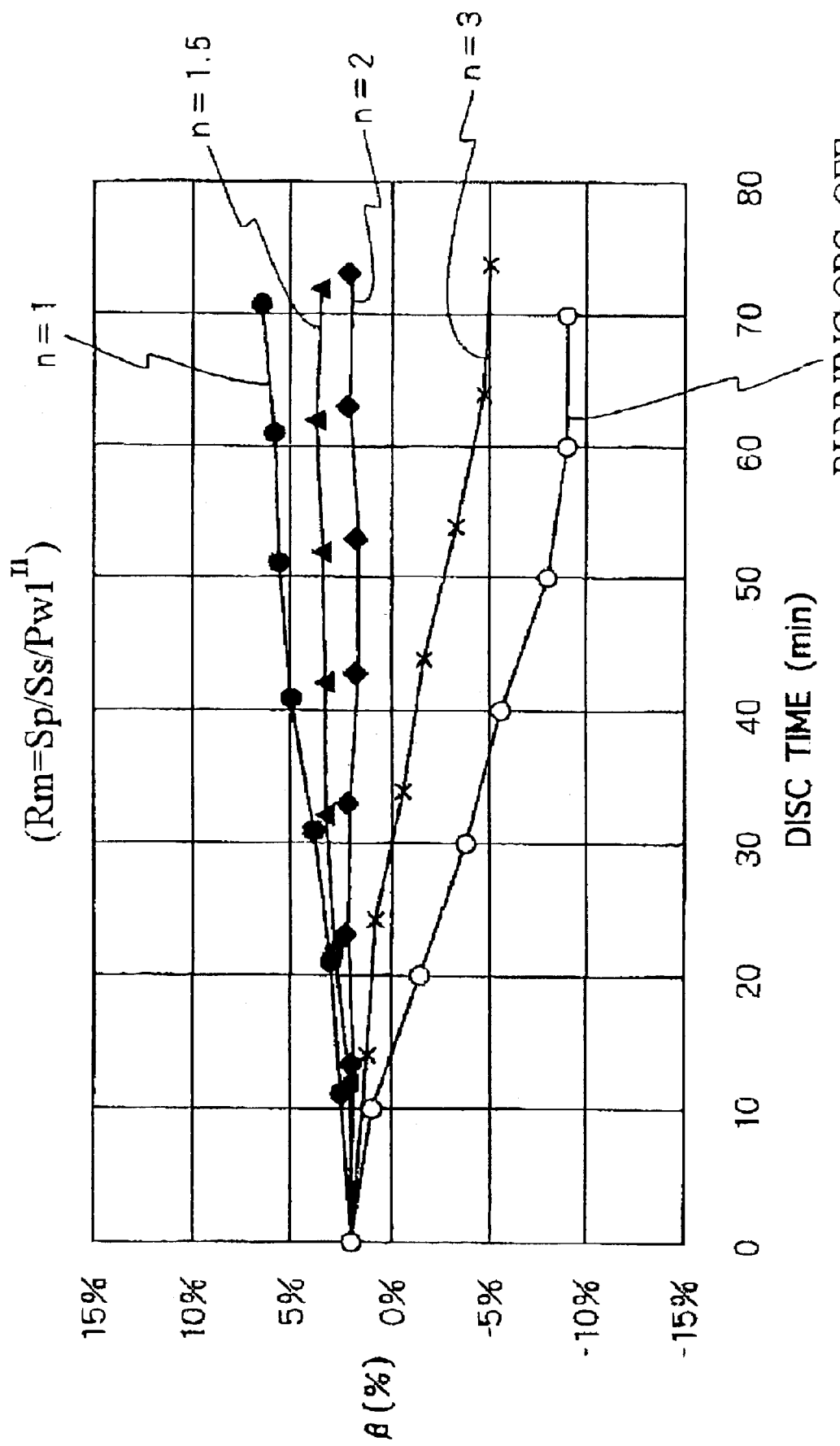
FIG. 4 is a diagram showing changes of a parameter β, which are observed by reproducing information recorded on an optical disk under various conditions.

FIG. 4 shows changes of the values of the parameter β representing recording conditions of an optical disk, where the values are obtained by reproducing information recorded on the optical disk under various conditions.

The information recording was performed under five conditions. Specifically, it was performed under conditions where the sensitivity coefficient γ was set at 1, 1.5, 2, and 3, and where the running OPC was not performed.

In each of the cases, when the recording was started, the power of the pit forming light was set such that an optimum recording condition obtained by OPC would be realized. Therefore, as shown in FIG. 4, in each of the cases, the value of β obtained immediately after reproduction was started is a value representing the optimum recording condition (objective value).

In the case of not performing the running OPC, the value of β greatly fluctuated. From this fact, it is obvious that the optimum recording condition was not maintained in the case where the running OPC was not performed.

On the other hand, in the cases where the running OPC was performed, fluctuation of the value of β was restricted as compared to the case where the running OPC was not performed. The degrees of restriction vary in accordance with the values of the sensitivity coefficient γ.

The fluctuation in the case of the sensitivity coefficient γ=2 is the smallest among the five cases shown in FIG. 4. It is thus apparent that it is the most appropriate to set the sensitivity coefficient γ at about 2(γ=2) in order to maintain the optimum recording condition, in case of the kind of the optical disk and the operational environment of the optical disk device used in the example of FIG. 4.

As explained above, by adjusting the value of the sensitivity coefficient γ, it is possible to perform the running OPC that is best for the kind of the optical disk and the operational environment of the optical disk device.

The value of the sensitivity coefficient γ suitable for performing optimum running OPC is derived by, for example, theoretical computing or experiments. In a case where optical disks of the same content are mass-produced using a plurality of optical disk devices, the respective sensitivity coefficients γ are set such that the unevenness of the recording conditions among the plurality of optical disk devices may be minimized.

The condition index Rm can be defined not only by the equation (6), but also by various equations indicated below.

(i) First Alternative

As described above, the level Ss represents the intensity of a reflection light (a space reflection light) from a space area where no pit is formed.

In a case where the power of a no-pit forming light to be irradiated on an optical disk is unstable, the level Ss can not be measured correctly. In this case, instead of the level Ss, a pre-measured reflection ratio Ref may be used, as shown by the equation (7) below.

$$Rm = Sp/Ref/Pw1^\gamma \qquad (7)$$

Rm: condition index
Sp: stable level of a pit reflection light
Ref: reflection ratio
Pw1: power of a pit forming light
γ: sensitivity coefficient of running OPC The reflection ratio Ref is given from a reflection ratio curve which represents the reflection ratio of the entire non-recorded area (including the PCA) of an optical disk where no information is recorded. The reflection ratio curve is obtained from reflection ratios measured at several points within the non-recorded area.

However, in a case where a reflection ratio of the entire non-recorded area is not required, the reflection ratio Ref can be obtained more simply than the above. For example, in a case where the reflection ratio of an area where the objective value of the condition index Rm is derived (the PCA, for example) and the reflection ratio of an area where information recording is started are only required, only the reflection ratios of the PCA and the recording starting area need to be measured.

(ii) Second Alternative

In a case where unevenness in the reflection ratios in the aforementioned non-recorded area can be ignored, the condition index Rm may be represented by the equation (8) below.

$$Rm = Sp/Pw1^\gamma \qquad (8)$$

Rm: condition index
Sp: stable level of a pit reflection light
Pw1: power of a pit forming light
γ: sensitivity coefficient of running OPC The equation (8) is simpler than equations (6) and (7). Therefore, when the equation (8) is employed, the process to be performed by the optical disk device is simpler than when the equation (6) or (7) is employed.

(iii) Third Alternative

In a case where the optical disk device comprises a Circuit for measuring the peak level Spk of a pit reflection light, the condition index Rm may be represented by the equation (9) below. The peak level Spk represents the level (intensity) of the peak of a pit reflection light which increases sharply immediately after irradiation of a pit forming light is started.

$$Rm = Spk \times \alpha \times \gamma - Sp \qquad (9)$$

Rm: condition index
Spk: peak level of a pit reflection light
α: coefficient for correcting the peak level
Sp: stable level of a pit reflection light
γ: sensitivity coefficient of running OPC The equation (9) is obtained based on the idea that the difference between the peak level Spk and the stable level Sp corresponds to the energy of a laser light absorbed in the optical disk and the recording condition is affected by the amount of the absorbed energy.

It is extremely difficult to accurately measure the peak level Spk due to various limitations such as characteristics of the measuring circuit, etc. Therefore, the measured peak level Spk is corrected using the correction coefficient α as shown by the equation (9). The correction coefficient is derived in advance based on experiments, etc.

(iv) Fourth Alternative

The condition index Rm may be represented by the equation (10) below which is obtained by multiplying the equation (9) by the power Pw1 of a pit forming light.

$$Rm = (Spk \times \alpha \times \gamma - Sp) \times Pw1 \qquad (10)$$

Rm: condition index
Spk: peak level of a pit reflection light
α: coefficient for correcting the peak level
Sp: stable level of a pit reflection light
γ: sensitivity coefficient of running OPC
Pw1: power of a pit forming light The equation (10) represents a value corresponding to the energy of a laser light absorbed in the optical disk, from an aspect different from that of the equation (9).

(v) Fifth Alternative

The condition index may be represented by the equation (11) below.

$$Rm=(Spk\times\alpha\times\gamma-Sp)/Ss \quad (1)$$

Rm: condition index
Spk: peak level of a pit reflection light
α: coefficient for correcting the peak level
γ: sensitivity coefficient of running OPC
Sp: stable level a pit reflection light
Ss: level of a space reflection light The equation (11) also represents the value corresponding to the energy of a laser light absorbed in the optical disk, from an aspect different from that the equation (9).

Also in case of using the equations (7) to (11), it is possible to perform optimum running OPC that is best suited to the kind of the optical disk and the operational environment of the optical disk device by adjusting the value of the sensitivity coefficient γ, likewise the case of using the equation (6).

In case of using the equations (9) to (11), the peak level Spk of a pit reflection light needs to be obtained. However, it is very difficult to measure the peak level Spk correctly and stably.

As shown by the equation (12) below, the peak level Spk can be represented using the level Ss of a space reflection light, the power Pw1 of a pit forming light, and the power Pr1 of a no-pit forming light all of which are easier to measure stably. Accordingly, if the equation (12) is used, the peak level Spk can be obtained more easily.

$$Spk=Ss/Pr1\times Pw1 \text{ or } Spk\times\alpha=Ss/Pr1\times Pw1 \quad (12)$$

Spk: peak level of a pit reflection light
α: coefficient for correcting the peak level
Ss: level of a space reflection light
Pr1: power of a no-pit forming light
Pw1: power of a pit forming light If the equation (12) is used, there is no need of measuring the peak level Spk which is hard to measure. In other wards, a measuring apparatus (or a measuring circuit) for measuring the peak level Spk is not necessary. This simplifies the structure of the optical disk device, and lowers costs required. Further, since the action to be performed by the optical disk device becomes simpler, the action of the optical disk device can be stable.

The above-indicated equations (6) to (12) are equations used for CLV (Constant Liner Velocity) recording in which the velocity for tracing the recording tracks (liner velocity) is constant.

According to CAV (Constant Angular Velocity) recording in which the rotation velocity of the optical disk is constant, i.e., the liner velocity changes, the equations (6) to (12) can not be used directly.

In case of CAV recording, equations (13) to (19) obtained by modifying the equations (6) to (12) are used.

The equations (13) to (19) are obtained by replacing the power Pw1 and the level Sp in the equations (6) to (12) with power and level which take into account the influence caused by liner velocity changes. Specifically, the power Pw1 and the level Sp should be divided by a ratio Rp of power changes due to liner velocity changes. As a result, the equations (13) to (19) used for CAV recording can be obtained.

$$Rm=(Sp/Rp)/Ss/(Pw1/Rp)^\gamma \quad (13)$$

$$Rm=(Sp/Rp)/Ref/(Pw1/Rp)^\gamma \quad (14)$$

$$Rm=(Sp/Rp)/(Pw1/Rp)^\gamma \quad (15)$$

$$Rm=Spk\times\alpha\times\gamma-Sp/Rp \quad (16)$$

$$Rm=(Spk\times\alpha\times\gamma-Sp/Rp)\times(Pw1/Rp) \quad (17)$$

$$Rm=(Spk\times\alpha\times\gamma-Sp/Rp)/Ss \quad (18)$$

$$Spk=Ss/Pr1\times(Pw1/Rp) \text{ or } Spk\times\alpha=Ss/Pr1\times(Pw1/Rp) \quad (19)$$

Rm: condition index
Sp: stable level of a pit reflection light
Ss: level of a space reflection light
Spk: peak level of a pit reflection light
Pw1: power of a pit forming light
Pr1: power of a no-pit forming light
Ref: reflection ratio
γ: sensitivity coefficient of running OPC
α: coefficient for correcting peak level
Rp: ratio of power changes due to liner velocity changes Also in case of CAV recording, it is possible to perform optimum running OPC suited to the kind of the optical disk and the operational environment of the optical disk device by adjusting the value of the sensitivity coefficient γ, likewise the case of CLV recording.

The above-indicated power change ratio Rp is represented by a function of a velocity Lv as shown by the equation (20) below, given that the recording strategy is constant. However, if the recording strategy changes, the power change ratio Rp is not necessarily represented by a single function. By the way, the velocity Lv may be a liner velocity, a liner velocity ratio or a recording velocity, etc.

$$Rp=f(Lv) \quad (20)$$

Rp: ratio of changes in the power of a laser light caused by liner velocity changes
Lv: liner velocity, liner velocity ratio, or recording velocity, etc.

Examples of a function representing the power change ratio Rp will be shown below.

The power change ratio Rp is theoretically proportional to the square root of the liner velocity ratio Lv. That is, the power change ratio Rp is represented by the equation (21) below.

$$Rp=\epsilon\times\sqrt{Lv} \quad (21)$$

Rp: ratio of changes in the power of a laser light caused by liner velocity changes
ε: proportionality constant
Lv: liner velocity ratio In a case where the recording strategy changes, the power change ratio Rp can be represented by the equation (22) below, with the use of a ratio Rps of power changes due to strategy changes. The power change ratio Rps is derived in advance based on theoretical computing or experiments.

$$Rp=\epsilon\times\sqrt{Lv}\times Rps \quad (22)$$

Rp: ratio of changes in the power of a laser light due to liner velocity changes
ε: proportionality constant of the power change ratio
Lv: liner velocity ratio
Rps: ratio of changes in the power of a laser light due to strategy changes Some of the above-indicated equations representing the condition index Rm include "γ-th power".

Calculation of "γ-th power" is performed by repeating multiplication γ times, in a case where the sensitivity coefficient γ is an integer. Accordingly, a program for deriving the condition index Rm will be simple. However, in a case where the sensitivity coefficient γ is not an integer, such a program will be very complicated.

In the case where the sensitivity coefficient γ is not an integer, γ can be represented by integers f and g (γ=f/g, or γ≈f/g).

Accordingly, the program can be simplified by appointing a value obtained by raising the condition index Rm to the g-th power as a new condition index Rm'.

In case of the equation (6) for example, the equation (6) can be modified to the equation (23) below.

$$Rm'=Rm^g=((Sp/Ss)^g)/(Pw1^f) \tag{23}$$

In this case, the objective value of the condition index Rm, which is derived by the OPC, should be raised to the g-th power. As a result, the condition index Rm' derived by the running OPC can be easily compared with the objective value.

Other equations than the equation (6) can be modified in the same manner as described above, if the sensitivity coefficient γ is not an integer.

(B) Optical Disk Device

Next, the structure of an optical disk device for performing the information recording method according to the present embodiment, will be explained.

Figure 5:
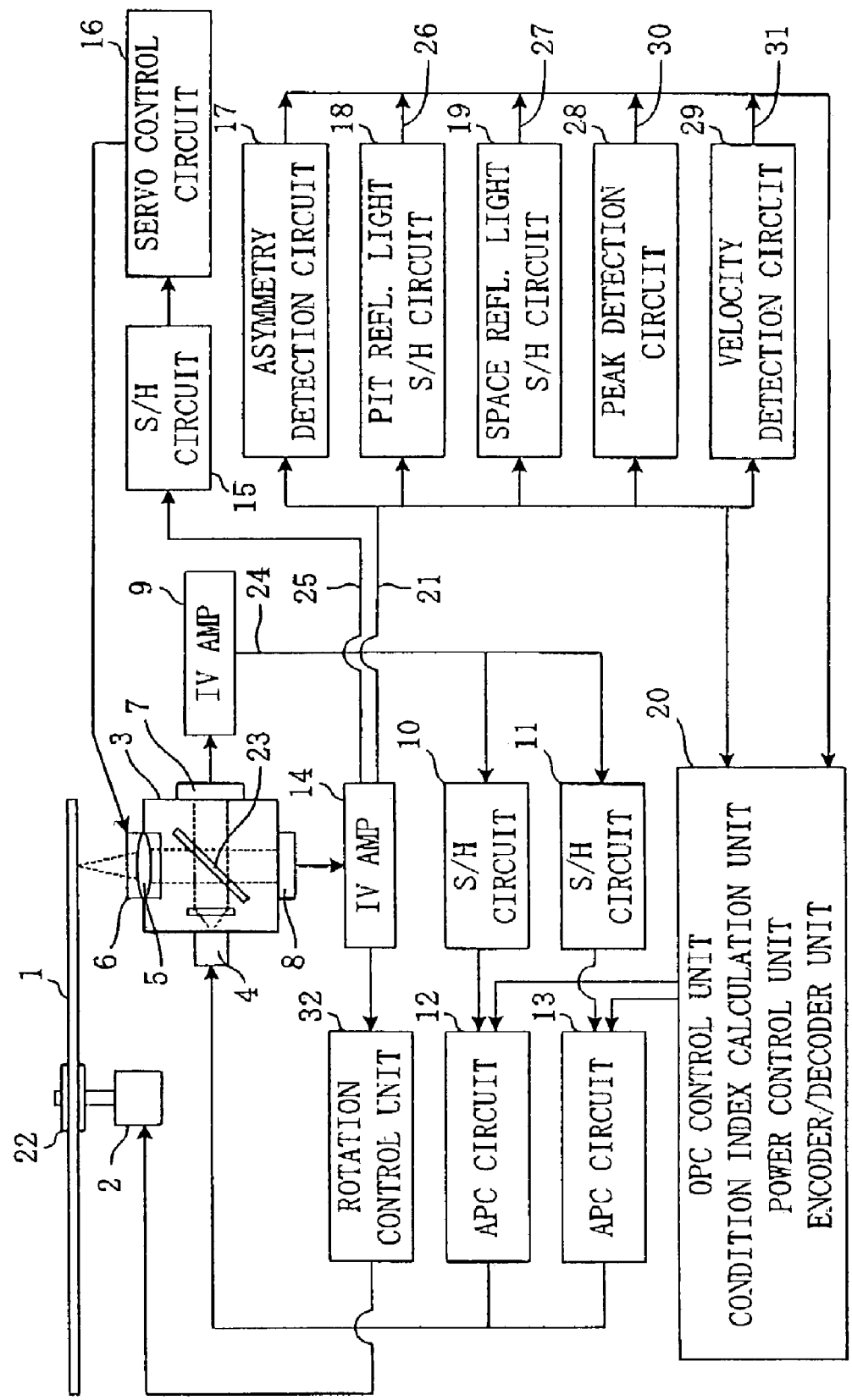
FIG. 5 is a diagram showing a structure of an optical disk device for performing an information recording method according to an embodiment of the present invention.

The optical disk device has the structure shown in FIG. 5, for example.

A spindle motor 2 rotates a turn table 22 on which an optical disk 1 is set, in accordance with the control of a rotation control unit 32.

The rotation control unit 32 rotates the turn table 22 at a predetermined rotation velocity by controlling the spindle motor 2.

Information is written on the optical disk 1 or read from the optical disk 1 by a laser light emitted from an optical head 3.

As shown in FIG. 5, the optical head 3 comprises an LD (Laser Diode) 4, an object lens 5, a tracking/focus mechanism 6, a front monitor 7, a photo detector 8, and a half mirror 23.

The LD 4 changes the power of a laser light it generates, in accordance with the control of APC (Auto Power Control) circuits 12 and 13. The laser light generated by the LD 4 reflects on the half mirror 23 to be irradiated to the optical disk 1 via the object lens 5. At this time, the focus of the object lens 5 is adjusted upon the optical disk 1.

The reflection light from the optical disk 1 penetrates through the object lens 5 and the half mirror 23, and reaches a plurality of light receiving elements constituting the photo detector 8. The receiving element is a photodiode, for example.

The photo detector 8 supplies current signals having levels respectively corresponding to the intensities of the lights received by the plurality of light receiving elements, to a current-voltage conversion amplifier (IV amp) 14.

The IV amp 14 converts the plurality of current signals supplied from the photo detector 8 into a plurality of voltage signals.

The IV amp 14 adds together some of the plurality of voltage signals obtained by conversion, that are obtained from the main portion of the reflection light. Then, the IV amp 14 supplies the resultant signal to a plurality of circuits 17, 18, 19, 28, and 29 as a reflection light signal (RF signal) 21 representing the intensity of the reflection light. The reflection light signal 21 is used for reading the information recorded on the optical disk 1 or for detecting the recording condition when recording information.

Further, the IV amp 14 supplies a matrix of the plurality of voltage signals obtained by conversion to a sample hold (S/H) circuit 15 as a servo control signal 25. The servo control signal 25 is used for performing a focusing control for adjusting the focus of the object lens 5 on the optical disk 1, and for performing a tracking control for letting the laser light spot trace the track of the optical disk 1.

The S/H circuit 15 samples and holds the servo control signal 25 supplied thereto at a predetermined timing, in accordance with the control of a control circuit 20. For example, the S/H circuit 15 performs sampling at a timing when the laser light is irradiated on a space area where no pit is to be formed. Then, the S/H circuit 15 supplies the signal obtained by sampling to a servo control circuit 16.

The servo control circuit 16 applies a predetermined process to the signal supplied from the sample hold circuit 15. Then, based on the process result, the servo control circuit 16 determines whether or not the focus is on the optical disk 1, and whether or not the spot of the laser light is on the track of the optical disk 1. The servo control circuit 16 drives the tracking/focus mechanism 6 based on the determination result. Due to this, the servo control circuit 16 moves the object lens 5 and adjusts the position of the focus and the position of the spot.

Further, the optical disk device comprises a sled mechanism (not illustrated) for moving the optical head 3 toward the internal circumference or toward the outer circumference of the optical disk 1. The servo control circuit 16 moves the optical head 3 toward the internal circumference or toward the outer circumference of the optical disk 1, by driving the sled mechanism (not illustrated) in accordance with the control of the control circuit 20. The position of the optical head 3 (the laser spot) is roughly adjusted to the target track, by this sled mechanism.

A part of the laser light emitted from the LD 4 penetrates through the half mirror 23, and enters the front monitor 7 constituted by a light receiving element. The receiving element is a photodiode, for example.

The front monitor 7 supplies a current signal having a level corresponding to the intensity of the received light, to an IV amp 9.

The IV amp 9 converts the current signal supplied from the front monitor 7 into a voltage signal, and supplies it to S/H circuits 10 and 11 as a front monitor signal 24. The front monitor signal 24 is used for APC (Auto Power Control) for keeping the power of the laser light generated by the LD 4 at a predetermined power.

The S/H circuit 10 samples and holds the front monitor signal 24 which is supplied when a no-pit forming light is irradiated, at a predetermined timing, in accordance with the control of the control circuit 20. Then, the S/H circuit 10 supplies the signal acquired by sampling to the APC circuit 12.

The S/H circuit 11 samples and holds the front monitor signal 24 which is supplied when a pit forming light is irradiated, at a predetermined timing, in accordance with the control of the control circuit 20. Then, the S/H circuit 11 supplies the signal acquired by sampling to the APC circuit 13.

The APC circuit 12 performs APC in accordance with the control of the control circuit 20. Specifically, the APC circuit 12 controls the power of a no-pit forming light generated by the LD 4, such that the level of the signal supplied from the sample hold circuit 10 may be the level which is set by the control circuit 20.

The APC circuit 13 performs APC in accordance with the control of the control circuit 20. Specifically, the APC circuit 13 controls the power of a pit forming light generated by the LD 4, such that the level of the signal supplied from the sample hold circuit 11 may be the level which is set by the control circuit 20.

The asymmetry detection circuit 17 derives the value of a parameter β (or asymmetry) representing the recording condition, using the reflection light signal 21 which is supplied when information is being reproduced, in accordance with the control of the control circuit 20. Then, the asymmetry detection circuit 17 outputs an asymmetry signal representing the derived value to the control circuit 20.

The pit reflection light S/H circuit 18 samples and holds the reflection light signal 21 which is supplied when information is being recorded, at a predetermined timing, in accordance with the control by the control circuit 20. Specifically, the control circuit 20 outputs a control signal such as shown in FIG. 3D to the pit reflection light S/H circuit 18. The pit reflection light S/H circuit 18 performs sampling at the timing represented by the control signal supplied thereto. As a result, the pit reflection light S/H circuit 18 obtains the stable level Sp of the pit reflection light. Then, the pit reflection light S/H circuit 18 supplies a signal having the obtained stable level Sp to the control circuit 20 as a pit reflection light signal 26.

The space reflection light S/H circuit 19 samples and holds the reflection light signal 21 which is supplied when information is being recorded, at a predetermined timing, in accordance with the control of the control Circuit 20. Specifically, the control circuit 20 outputs a control signal such as shown in FIG. 3E to the space reflection light S/H circuit 19. The space reflection light S/H circuit 19 performs sampling at the timing represented by the control signal supplied thereto. As a result, the space reflection light S/H circuit 19 obtains the level Ss of the space reflection light. Then, the space reflection light S/H circuit 19 supplies a signal having the obtained level Ss to the control circuit 20, as a space reflection light signal 27.

The peak detection circuit 28 detects the peak of the intensity of the pit reflection light, such as shown in FIG. 3C, using the reflection light signal 21 supplied thereto. Then, the peak detection circuit 28 measures the intensity of the detected peak (peak level Spk). The peak detection circuit 28 supplies a signal representing the measured peak level Spk, to the control circuit 20 as a peak signal 30.

The velocity detection circuit 29 derives a velocity Lv along the track of the optical disk 1, based on the reflection light signal 21 which is supplied when information is being recorded and is being reproduced. For example, the velocity detection circuit 29 derives the velocity Lv by comparing the waveform of the supplied reflection light signal 21 with a reference waveform derived in advance based on theoretical computing or experiments. Then, the velocity detection circuit 29 supplies a velocity signal 31 representing the derived velocity Lv to the control circuit 20. Note that the velocity Lv derived by the velocity detection circuit 29 may be a liner velocity, a liner velocity ratio, a recording velocity, etc.

The control circuit 20 is constituted by, for example, a microcomputer. The control circuit 20 stores a program for recording and reproducing information. The control circuit 20 operates in accordance with the stored program. Further, the control circuit 20 stores values necessary for deriving the condition index Rm. The necessary values are, for example, the sensitivity coefficient γ, the correction coefficient α, the proportionality constant ε, etc. The optimum values for these values are derived in advance based on theoretical computing or experiments. The control circuit 20 acts as an OPC control unit, a condition index calculation unit, a power control unit, and an ENCODER/DECODER unit, etc., and controls operations of each component included in the optical disk device.

The control circuit 20 as the OPC control unit performs the OPC by controlling operations of each component.

The control circuit 20 as the condition index calculation unit derives the condition index Rm by controlling operations of each component.

The control circuit 20 as the power control unit controls the power of the laser light to be irradiated on the optical disk 1, by controlling operations of each component.

The control circuit 20 as the ENCODER/DECODER unit encodes information to be written on the optical disk 1 or decodes information read from the optical disk 1.

The detailed operation of the control Circuit 20 will be described later.

(C) Operation of Optical Disk Device

Next, the operation of the optical disk device described above will be explained.

First, the objective value of the condition index Rm is derived by the OPC. After this, information is recorded on the optical disk 1 by performing the running OPC.

Some methods for deriving the objective value of the condition index Rm will be described below.

(i) First Example

Figure 6:
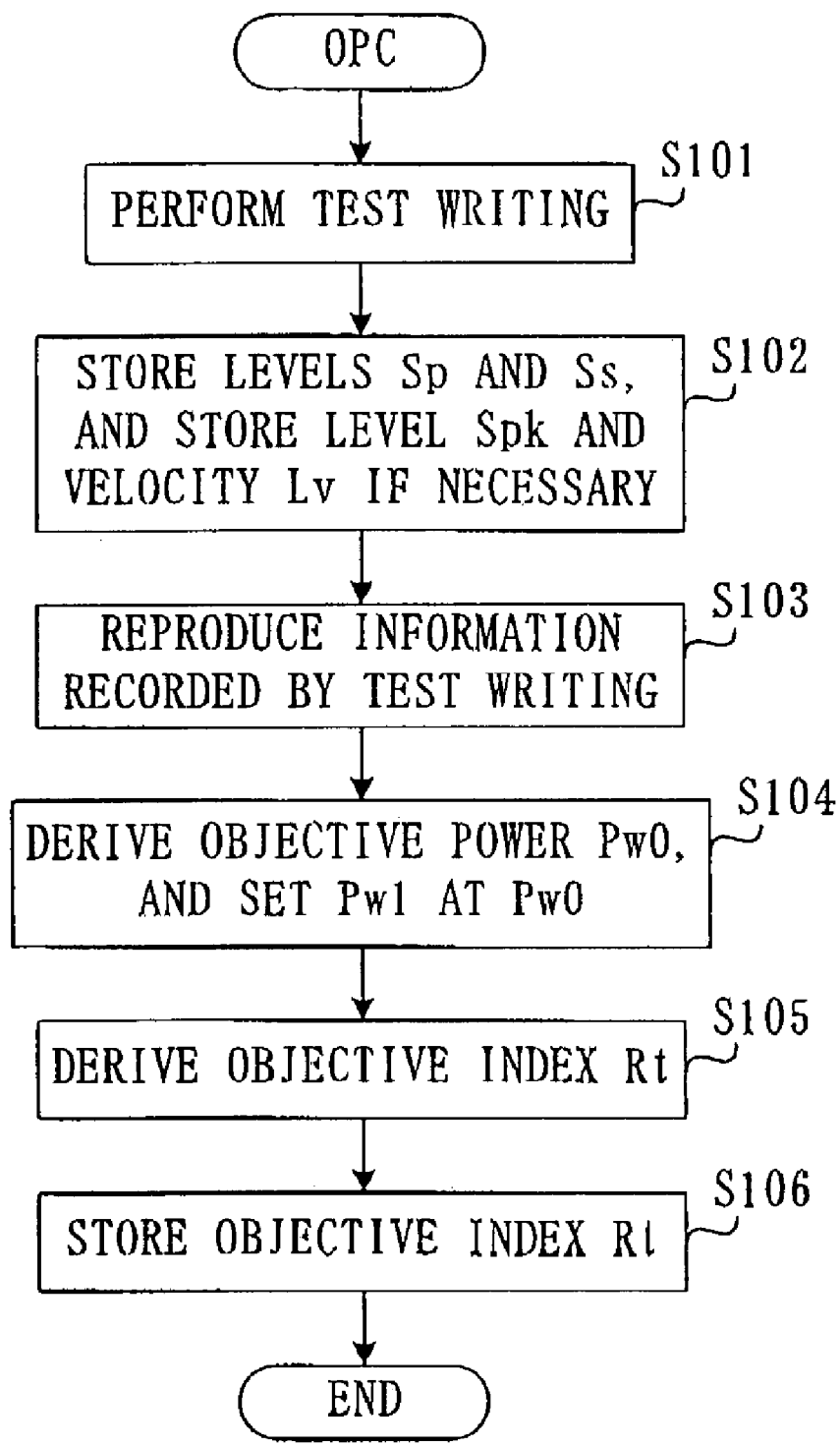
FIG. 6 is a flowchart showing an example of an operation performed by a control circuit included in an optical disk device.

FIG. 6 is a flowchart showing one example of the operation of the control circuit 20.

First, the control circuit 20 performs test writing in the PCA prepared on the optical disk 1, by controlling the APC circuits 12 and 13, the servo control circuit 16, and the rotation control unit 32 (step S101).

Specifically, the control circuit 20 irradiates a pit forming light and a no-pit forming light alternately onto the optical disk 1. At this time, the control circuit 20 changes the power of the pit forming light step-wise. Due to this, a plurality of pits are formed in the PCA by the varied powers.

At the same time, the pit reflection light S/H circuit 18 samples the supplied reflection light signal. 21 at a predetermined timing. Then, the pit reflection light S/H circuit 18 supplies the pit reflection light signal 26 representing the stable level Sp of the pit reflection light, to the control circuit 20.

The space reflection light S/H circuit 19 samples the supplied reflection light signal 21 at a predetermined timing. Then, the space reflection light S/H circuit 19 supplies the space reflection light signal 27 representing the level Ss of the space reflection light to the control circuit 20.

The velocity detection circuit 29 derives the velocity Lv, using the supplied reflection light signal 21. Then, the velocity detection circuit 29 supplies the velocity signal 31 representing the derived velocity Lv to the control circuit 20.

The peak detection circuit 28 derives the peak level Spk of the pit reflection light, using the supplied reflection light signal 21. Then, the peak detection circuit 28 supplies the peak signal 30 representing the derived peak level Spk to the control circuit 20.

The control circuit 20 stores the stable level Sp of the pit reflection light and the level Ss of the space reflection light which are represented by the signals supplied thereto. Further, the control circuit 20 stores the velocity Lv and the peak level Spk of the pit reflection light which are represented by the signals supplied thereto, if necessary (step S102).

Next, the control circuit 20 reproduces the information which is test-written in the PCA, by controlling the APC circuits 12 and 13, the servo control circuit 16, and the rotation control unit 32 (step S103).

At this time, the asymmetry detection Circuit 17 derives the recording condition (value of the parameter β), using the supplied reflection light signal 21. In other words, the asymmetry detection circuit 17 detects the states of the plurality of pits formed in the APC. Then, the asymmetry detection circuit 17 outputs an asymmetry signal representing the derived β value, to the control circuit 20.

The control circuit 20 compares each β value represented by the supplied asymmetry signal, with the objective value of β representing the optimum recording condition, and determines a power (objective power Pw0) that realizes the objective value of β by performing a predetermined calculation. Note that the objective value of β varies depending on the kind of the optical disk 1, and is set in the control circuit 20 in advance.

Then, the control circuit 20 sets the power Pw1 of the pit forming light to be irradiated to the data recording area prepared on the optical disk 1, at the derived objective power Pw0 (step S104).

Next, the control circuit 20 derives the condition index (objective index Rt) of the case where the optimum recording condition is realized, by using the levels Sp, Ss, and Spk and the velocity Lv stored in step S102, the objective power Pw1 (=Pw0) derived in step S104, and one or more of the above-indicated equations (6) to (22) (step S105). The equation to be used is indicated by a program stored in the control circuit 20.

Then, the control circuit 20 stores the derived objective index Rt (step S106).

(ii) Second Example

Figure 7:
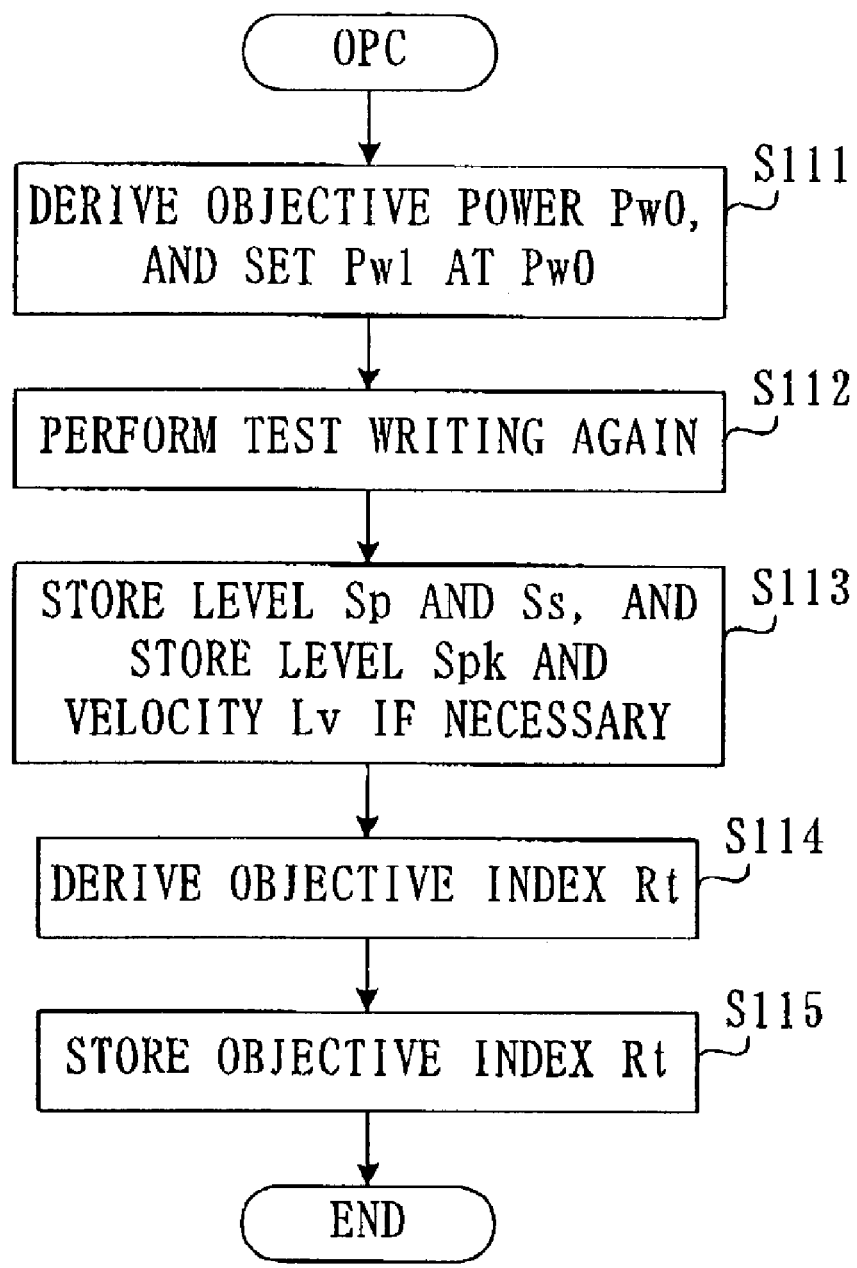
FIG. 7 is a flowchart showing an example of an operation performed by a control Circuit included in an optical disk device.

FIG. 7 is a flowchart showing one example of the operation of the control circuit 20.

First, the control circuit 20 derives the objective power Pw0 for realizing the optimum recording condition in the same manner as described above, and sets the power Pw1 of the pit forming light at the objective power Pw0 (step S111). At this time, the control circuit 20 leaves several frames of the PCA unrecorded.

Next, the control circuit 20 performs test writing again, in the several frames of the PCA left unused, by controlling the APC circuits 12 and 13, the servo control circuit 16, and the rotation control unit 32 (step S112). At this time, the power Pw1 of the pit forming light to be irradiated to the optical disk 1 is set at the objective power Pw0.

Meanwhile, the pit reflection light S/H circuit 18 supplies the pit reflection light signal 26 representing the stable level Sp of the pit reflection light to the control circuit 20, likewise the above example.

The space reflection light S/H circuit 19 supplies the space reflection light signal 27 representing the level Ss of the space reflection light to the control circuit 20, likewise the above example.

The velocity detection circuit 29 supplies the velocity signal 31 representing the derived velocity Lv to the control circuit 20, likewise the above example.

The peak detection circuit 28 supplies the peak signal 30 representing the detected peak level Spk to the control circuit 20, likewise the above example The control circuit 20 stores the stable level Sp of the pit reflection light and the level Ss of the space reflection light which are represented by the supplied signals. Further, the control circuit 20 stores the velocity Lv and the peak level Spk of the pit reflection light which are represented by the supplied signals, if necessary (step S113).

Thereafter, the control circuit 20 derives the condition index (objective index Rt) of the case where the optimum recording condition is realized, using one or more of the equations (6) to (22) (step S114), and stores the derived objective index Rt (step S115), likewise the above example.

(iii) Third Example

Figure 8:
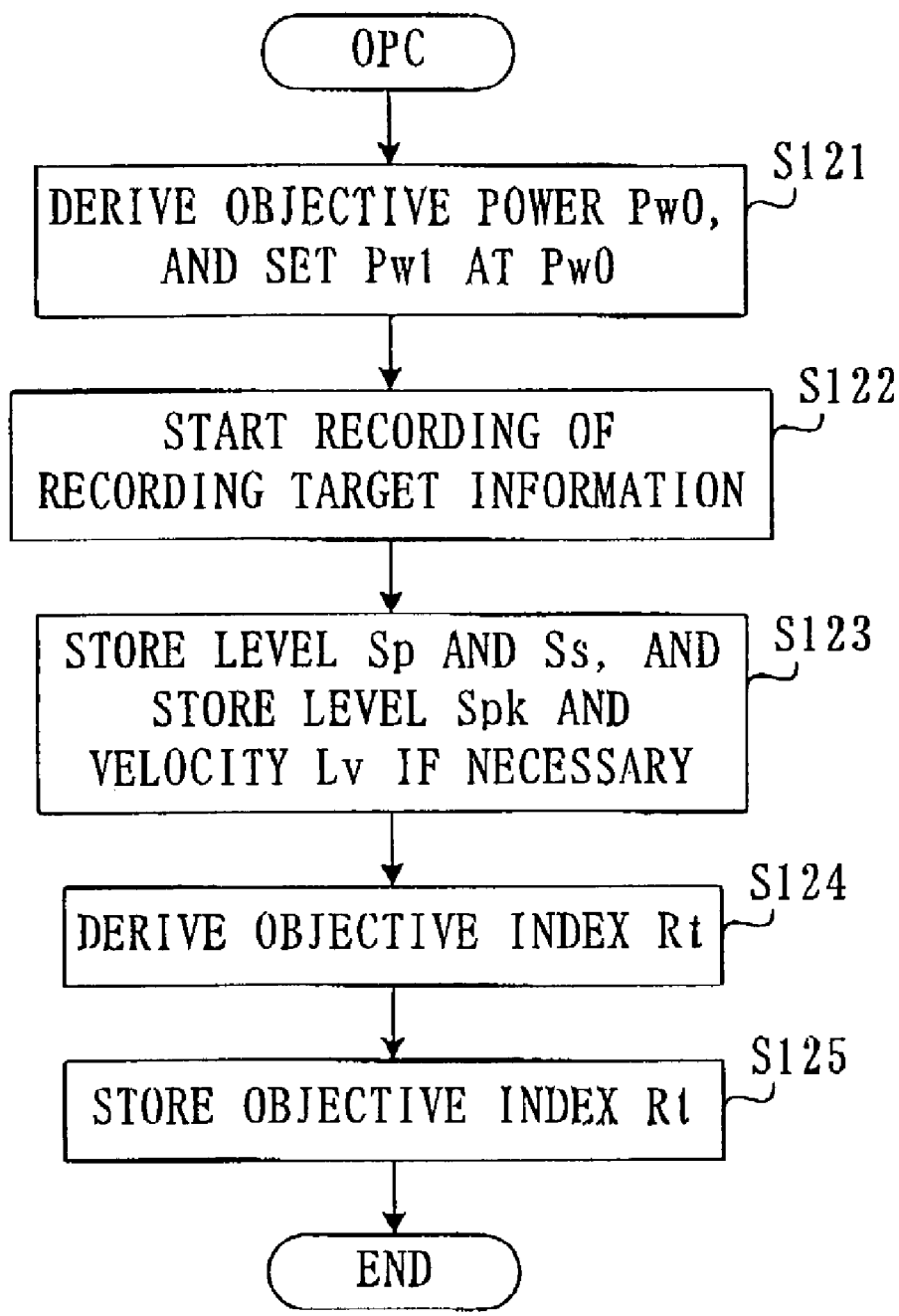
FIG. 8 is a flowchart showing an example of an operation performed by a control circuit included in an optical disk device.

FIG. 8 is a flowchart showing one example of the operation of the control circuit 20.

First, the control circuit 20 derives the objective power Pw0 for realizing the optimum recording condition likewise the above examples, and sets the power Pw1 of the pit forming light at the objective power Pw0 (step S121).

Then, the control circuit 20 starts recording of information which is the target of recording, in the data recording area prepared on the optical disk 1, by controlling the APC circuits 12 and 13, the servo control circuit 16, and the rotation control unit 32 (step S122). At this time, the power Pw1 of the pit forming light to be irradiated to the optical disk 1 is set to the objective power Pw0.

After information recording is started, the pit reflection light S/H circuit 18 supplies the pit reflection light signal 26 representing the stable level Sp of the pit reflection light to the control circuit 20, likewise the above examples.

The space reflection light S/H circuit 19 supplies the space reflection light signal 27 representing the level Ss of the space reflection light to the control circuit 20, likewise the above examples.

The velocity detection circuit 29 supplies the velocity signal 31 representing the derived velocity Lv to the control circuit 20, likewise the above examples.

The peak detection circuit 28 supplies the peak signal 30 representing the detected peak level Spk to the control circuit 20, likewise the above examples.

The control circuit 20 stores the stable level Sp of the pit reflection light and the level Ss of the space reflection light which are represented by the supplied signals. Further, the control circuit 20 stores the velocity Lv and the peak level Spk of the pit reflection light which are represented by the supplied signals, if necessary (step S123).

Then, the control circuit 20 derives the condition index (objective index Rt) of the case where the optimum recording condition is realized, using the levels Sp, Ss, and Spk and the velocity Lv represented by the signals supplied immediately after information recording is started, and also using one or more of the equations (6) to (22) (step S124), likewise the above examples.

Then, the control circuit 20 stores the derived objective index Rt (step S125).

The control circuit 20 performs the running OPC using the objective index Rt derived by any one of the above-described methods (i) to (iii), thereby recording the recording target information on the optical disk 1.

Figure 9:
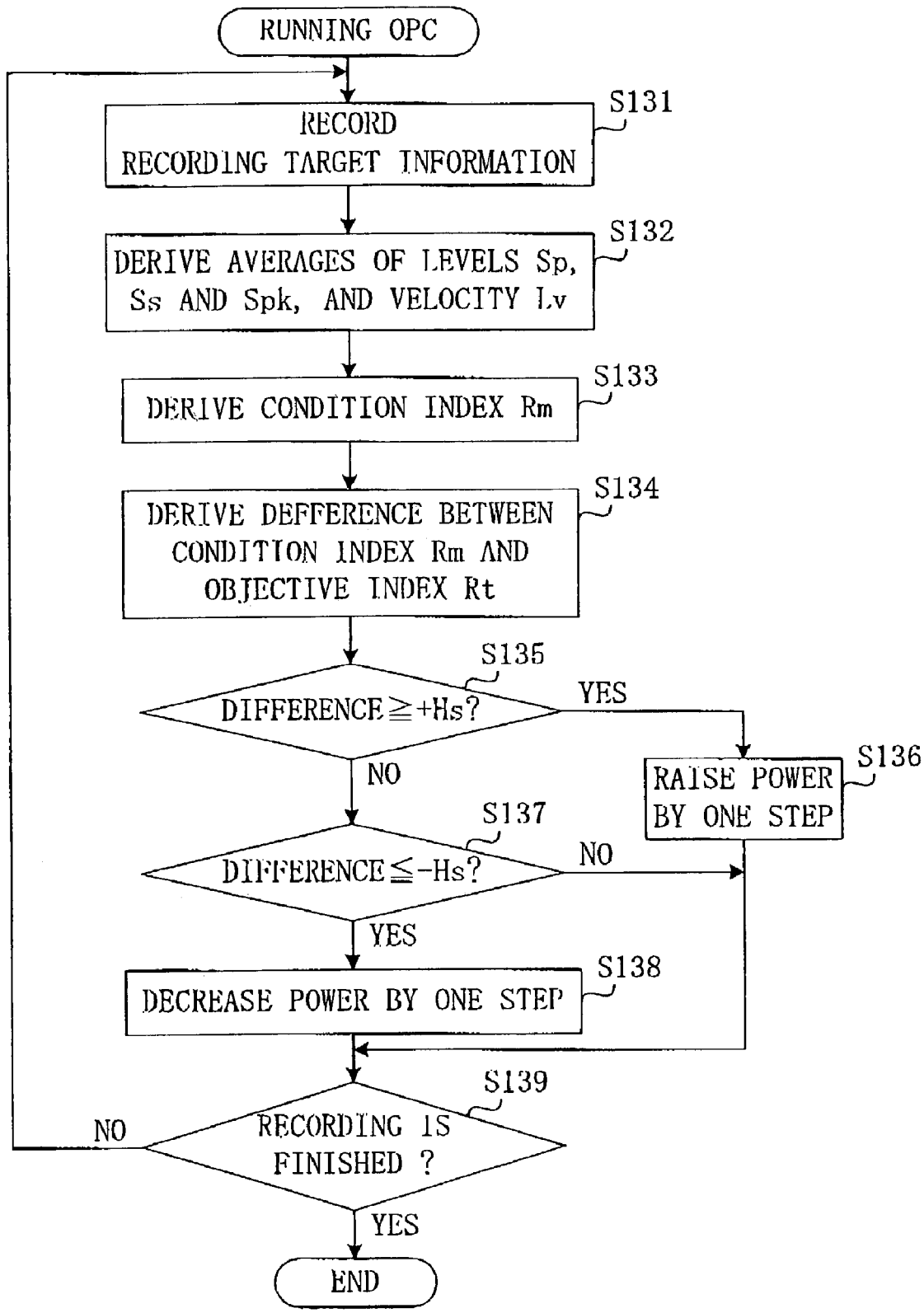
FIG. 9 is a flowchart for explaining running OPC (Optimum Power Calibration) performed by a control circuit.
Figure 10:
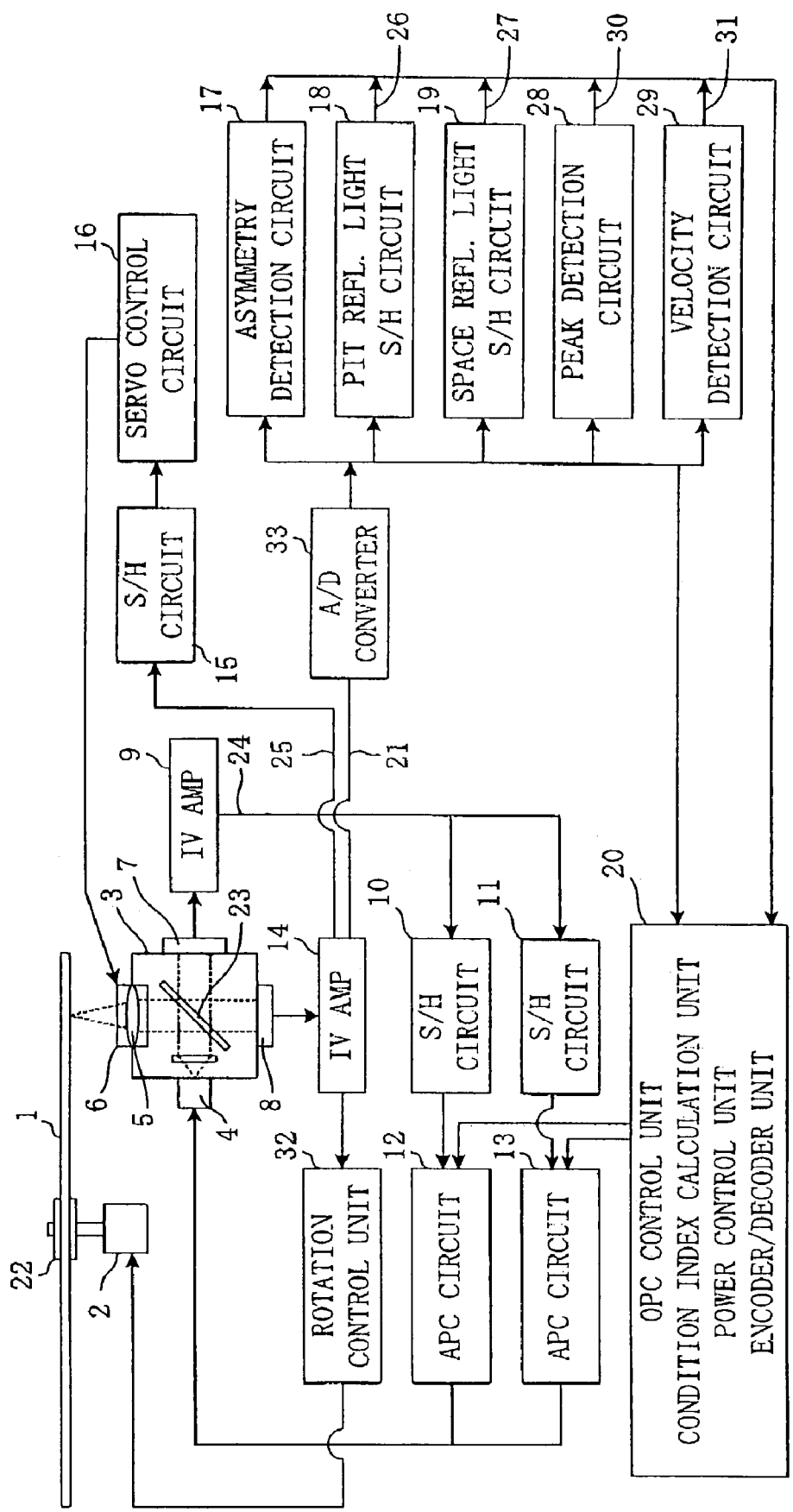
FIG. 10 is a diagram showing another example of a structure of an optical disk device.

FIG. 9 is a flowchart explaining the running OPC performed by the control circuit 20.

First, the control circuit 20 records recording target information in the data recording area of the optical disk 1, by controlling the APC circuits 12 and 13, the servo control circuit 16, and the rotation control unit 32 (step S131). At the start of recording, the power Pw1 of the pit forming light to be irradiated onto the optical disk 1 is set at the objective power Pw0 obtained by the OPC performed earlier.

After information recording is started, the pit reflection light S/H circuit 18 supplies the pit reflection light signal 26 representing the stable level Sp of the pit reflection light to the control circuit 20, likewise the above.

The space reflection light S/H circuit 19 supplies the space reflection light signal 27 representing the level Ss of the space reflection light to the control circuit 20, likewise the above.

The velocity detection circuit 29 supplies the velocity signal 31 representing the derived velocity Lv to the control circuit 20, likewise the above.

The peak detection circuit 28 supplies the peak signal 30 representing the detected peak level Spk to the control circuit 20, likewise the above.

The control circuit 20 sequentially stores the levels Sp, Ss, and Spk and the velocity Lv which are represented by the supplied signals. The control circuit 20 derives the average of each of the levels Sp, Ss, and Spk, and the average of the velocity Lv respectively, using the stored values, when the optical disk 1 finishes one rotation or more (step S132). As a result, fluctuation of values due to rotation of the optical disk 1 is averaged. The control circuit 20 uses the derived averages respectively as the values of the levels Sp, Ss, and Spk and the velocity Lv.

Then, the control circuit 20 derives the condition index Rm using the values derived in step S132 and one or more of the equations (6) to (22) (step S133).

Next, the control circuit 20 derives the difference ΔRm between the condition index Rm derived in step S133 and the objective value Rt derived by the OPC described above, in accordance with the equation (40) below (step S134).

$$\Delta Rm = Rm - Rt \quad (40)$$

After this, the control circuit 20 determines whether or not the derived difference ΔRm falls within a range in which the optimum recording condition can be maintained (−Hs<ΔRm<+Hs). This range varies in accordance with the kind of the optical disk 1 and the operational environment of the optical disk device. The threshold (−Hs, +Hs) is derived in advance based on theoretical computing and experiments, and set in the control circuit 20 in advance.

Specifically, the control circuit 20 determines whether or not the difference ΔRm is equal to or greater than the threshold (+Hs) (step S135).

In a case where determining that the difference ΔRm is equal to or greater than the threshold (+Hs) (step S135; YES), the control circuit 20 determines that the power Pw1 is too weak to maintain the recording condition. Then, the control circuit 20 controls the APC circuit 13 to raise the power Pw1 of the pit forming light generated by the LD4 by one step (ΔPw), as indicated by the expression (41) below (step S136).

$$(\text{power Pw1}) \leftarrow (\text{power Pw1}) + \Delta Pw \quad (41)$$

On the other hand, in a case where determining that the difference ΔRm is not equal to or larger than the threshold (+Hs) (step S1.35; NO), the control circuit 20 determines whether or not the difference ΔRm is equal to or smaller than the threshold (−Hs) (step S137).

In a case where determining that the difference ΔRm is equal to or smaller than the threshold (−Hs) (step S137; YES), the control circuit 20 determines that the power Pw1 is too high to maintain the recording condition. Then, the control circuit 20 controls the APC circuit 13 to decrease the power Pw1 of the pit forming light generated by the LD4 by one step (ΔPw), as indicated by the expression (42) below (step S138).

$$(\text{power Pw1}) \leftarrow (\text{power Pw1}) - \Delta Pw \quad (42)$$

On the other hand, in a case where determining that the difference ΔRm is not equal to or smaller than the threshold (−Hs) (step S137; NO), the control circuit 20 determines that the difference ΔRm is within the range in which the optimum recording condition can be maintained (−Hs<ΔRm<+Hs). Accordingly, the control circuit 20 continues recording with the power Pw1 of the pit forming light kept at the current level.

Afterwards, the control circuit 20 determines whether or not recording of the recording target information has been finished (step S139).

In a case where determining that recording has not been finished (step S139; NO), the control circuit 20 performs the process of step S131 to continue in formation recording.

On the other hand, in a case where determining that recording has been finished (step S139; YES), the control circuit 20 ends the running OPC.

As described above, the condition index Rm is derived by using one or more of the equations (6) to (22) in step S133.

By selecting an optimum equation and an optimum sensitivity coefficient γ in accordance with the kind of the optical disk 1 and the operational environment of the optical disk device, it is possible to performing information recording stably while the optimum recording condition is maintained. Further, it is possible to make the value of β substantially uniform. In other words, it is possible to perform optimum running OPC suited to the kind of the optical disk and the operational environment of the optical disk device.

The optical disk device shown in FIG. 5 may further comprise an A/D (analog/digital) converter 33. Further, the asymmetry detection circuit 17, the pit reflection light S/H circuit 1.8, the space reflection light S/H circuit 19, the peak detection circuit 28, and the velocity detection circuit 29 may be constituted by digital computing circuits.

The A/D converter 33 converts the reflection light signal 21 supplied from the IV amp 14 into a digital signal. The asymmetry detection circuit 17, the pit reflection light S/H circuit 18, the space reflection light S/H circuit 19, the peak detection circuit 28, and the velocity detection circuit 29 may derive, the value β, the levels Sp, Ss, and Spk, and the velocity Lv respectively, using the digital signal obtained by conversion.

Further, the power Pw1 of the pit forming light included in the above-indicated equations may be substituted for by an equivalent of the power Pw1 (substantially the same factor). For example, the intensity of a light received by the front monitor 7 may be used as the power Pw1. Further, in a case where a working push-pull method is employed, the intensity (level) of a reflection light of a sub beam may be used as the power Pw1.

Further, the control circuit 20 may perform test writing in the PCA of the optical disk 1 a predetermined number of times, using a different equation and a different sensitivity coefficient γ each time. By doing so, the control circuit 20 may find out an equation and a sensitivity coefficient γ with which the optimum recording condition can be maintained, i.e., with which fluctuation of the parameter β can be restricted the most. In other words, the control circuit 20 may find out an optimum equation and an optimum sensitivity coefficient γ that are suited to the kind of the optical disk 1 and the operational environment of the optical disk device, by performing test writing a plurality of times. Then, the control circuit 20 may perform the OPC and/or the running OPC, using the thus obtained equation and sensitivity coefficient γ.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-061306 filed on Mar. 7, 2002 and including specification, claims, drawings and summary. The disclosure of the above Japanese Patent Application is incorporated herein by reference in its entirety.

What is claimed is:

1. An information recording method of recording information on an optical disk, comprising:
    an information recording step of forming a plurality of pits representing recording target information on said optical disk by controlling a power of a laser light to be irradiated onto said optical disk;
    condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and
    a power adjusting step of adjusting the power of the laser light to be irradiated in said information recording step, in order that said recording condition may be a predetermined recording condition, based on said condition index derived in said condition detecting step,
    wherein said equation includes a coefficient which is determined in accordance with the kind of said optical disk and the environment in which information recording is performed, and
    wherein said equation is represented by $Rm = Sp/Ss/Pw1^\gamma$ (where Rm represents said condition index, Sp represents a level of a portion of a reflection light from said optical disk in case of a pit being formed, in which portion a light intensity is stable, Ss represents a level of a portion of a reflection light from said optical disk in case of a pit not being formed, in which portion a light intensity is stable, and $\gamma$ represents said coefficient determined in accordance with the kind of said optical disk and the environment in which information recording is performed),
    said information recording method further comprises:
    a first detecting step of detecting the level Sp; and
    a second detecting step of detecting the level Ss, and
    said condition detecting step includes a step of deriving said condition index Rm by using the detected levels Sp and Ss, and said equation, in a case where a velocity along tracks of said optical disk is constant.

2. An information recording method of recording information on an optical disk, comprising:
    an information recording step of forming a plurality of pits representing recording target information on said optical disk-by controlling a power of a laser light to be irradiated onto said optical disk;
    condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and
    a power adjusting step of adjusting the power of the laser light to be irradiated in said information recording step, in order that said recording condition may be a predetermined recording condition, based on said condition index derived in said condition detecting step,
    wherein said equation includes a coefficient which is determined in accordance with the kind of said optical disk and the environment in which information recording is performed, and
    wherein said equation is represented by $Rm = Sp/Ref/Pw1^\gamma$ (where Rm represents said condition index, Sp represents a level of a portion of a reflection light from said optical disk in case of a pit being formed, in which portion a light intensity is stable, Ref represents a reflection ratio of said optical disk, Pw1 represents a power of a laser light for forming a pit, and $\gamma$ represents said coefficient determined in accordance with the kind of said optical disk and environment in which information recording is performed),
    said information recording method further comprises a level detecting step of detecting the level Sp, and
    said condition detecting step includes a step of deriving said condition index Rm by using the detected level Sp and said equation, in a case where a velocity along tracks of said optical disk is constant.

3. An information recording method of recording information on an optical disk, comprising:
    an information recording step of forming a plurality of pits representing recording target information on said optical disk by controlling a power of a laser light to be irradiated onto said optical disk;
    condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and
    a power adjusting step of adjusting the power of the laser light to be irradiated in said information recording step, in order that said recording condition may be a predetermined recording condition, based on said condition index derived in said condition detecting step,
    wherein said equation includes a coefficient which is determined in accordance with the kind of said optical disk and the environment in which information recording is performed, and
    wherein said equation is represented by $Rm = Sp/Pw1^\gamma$ (where Rm is said condition index, Sp represents a level of a portion of a reflection light from said optical disk in case of a pit being formed, in which portion a light intensity is stable, Pw1 represents a power of a laser light for forming a pit, and $\gamma$ represents said coefficient determined in accordance with the kind of said optical disk and the environment in which information recording is performed),
    said information recording method further comprises a level detecting step of detecting the level Sp, and
    said condition detecting step includes a step of deriving said condition index Rm by using the detected level Sp and said equation, in a case where a velocity along tracks of said optical disk is constant.

4. An information recording method of recording information on an optical disk, comprising:
    an information recording step of forming a plurality of pits representing recording target information on said optical disk by controlling a power of a laser light to be irradiated onto said optical disk;

condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and a power adjusting step of adjusting the power of the laser light to be irradiated in said information recording step, in order that said recording condition may be a predetermined recording condition, based on said condition index derived in said condition detecting step, wherein said equation includes a coefficient which is determined in accordance with the kind of said optical disk and the environment in which information recording is performed, and wherein said equation is represented by $Rm = Spk \times \alpha \times \gamma - Sp$ (where Rm represents said condition index, Spk represents a level of a portion of a reflection light from said optical disk in case of a pit being formed, in which portion a light intensity reaches a peak, $\alpha$ represents a correction coefficient for correcting the peak level, $\gamma$ represents said coefficient determined in accordance with the kind of said optical disk and the environment in which information recording is performed, and Sp represents a level of a portion of a reflection light from said optical disk in case of a pit being formed, in which portion a light intensity is stable), said information recording method further comprises:

a peak detecting step of detecting the level Spk; and a level detecting step of detecting the level Sp, and said condition detecting step includes a step of deriving said condition index Rm by using the detected levels Spk and Sp, and said equation, in a case where a velocity along tracks of said optical disk is constant.

5. An information recording method of recording information on an optical disk, comprising:

an information recording step of forming a plurality of pits representing recording target information on said optical disk by controlling a power of a laser light to be irradiated onto said optical disk;

condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and a power adjusting step of adjusting the power of the laser light to be irradiated in said information recording step, in order that said recording condition may be a predetermined recording condition, based on said condition index derived in said condition detecting step, wherein said equation includes a coefficient which is determined in accordance with the kind of said optical disk and the environment in which information recording is performed, and wherein said equation is represented by $Rm = (Spk \times \alpha \times \gamma - Sp) \times Pw1$ (where Rm represents said condition index, Spk represents a level of a portion of a reflection light from said optical disk in case of a pit being formed, in which portion a light intensity reaches a peak, $\alpha$ represents a correction coefficient for correcting the peak level, $\gamma$ represents said coefficient determined in accordance with the kind of said optical disk and the environment in which information recording is performed, Sp represent a level of a portion of a reflection light from said optical disk in case of a pit being formed, in which portion a light intensity is stable, and Pw1 represents a power of a laser light for forming a pit), said information recording method further comprises:

a peak detecting step of detecting the level Spk; and a level detecting step of detecting the level Sp, and said condition detecting step includes a step of deriving said condition index Rm by using the detected levels Spk and Sp and said equation, in a case where a velocity along tracks of said optical disk is constant.

6. An information recording method of recording information on an optical disk, comprising:

an information recording step of forming a plurality of pits representing recording target information on said optical disk by controlling a power of a laser light to be irradiated onto said optical disk;

condition detecting step of deriving a condition index representing a recording condition of said optical disk, while the laser light is irradiated onto said optical disk in said information recording step, by using an equation which is changeable in accordance with a kind of said optical disk and an environment in which information recording is performed; and a power adjusting step of adjusting the power of the laser light to be irradiated in said information recording step, in order that said recording condition may be a predetermined recording condition, based on said condition index derived in said condition detecting step, wherein said equation includes a coefficient which is determined in accordance with the kind of said optical disk and the environment in which information recording is performed, and wherein said equation is represented by $Rm = (Spk \times \alpha \times \gamma - Sp)Ss$ (Rm represents said condition index, Spk represents a level of a portion of a reflection light from said optical disk in case of a pit being formed, in which portion a light intensity reaches a peak, $\alpha$ represents a correction coefficient for correcting the peak level, $\gamma$ represents said coefficient determined in accordance with the kind of said optical disk and the environment in which information recording is performed, Sp represents a level of a portion of a reflection light from said optical disk in case of a pit being formed, in which portion a light intensity is stable, and Ss represents a level of a portion of a reflection light from said optical disk in case of a pit not being formed, in which portion a light intensity is stable), said information recording method further comprises:

a peak detecting step of detecting the level Spk;

a first level detecting step of detecting the level Sp; and a second level detecting step of detecting the level Ss, and said condition detecting step includes a step of deriving said condition index Rm by using the detected levels Spk, Sp, and Ss, and said equation, in a case where a velocity along tracks of said optical disk is constant.

7. The information recording method according to claim 4, wherein said peak detecting step includes a step of deriving the level Spk by using an equation $Spk = Ss/Pr1 \times Pw1$ or an equation $Spk \times \alpha = Ss/Pr1 \times Pw1$ (where Ss represents a level of a portion of a reflection light from said optical disk in case of a pit not being formed, in which portion a light intensity is stable, Pr1 represents a power of a laser light for forming no pit, and Pw1 represents a power of a laser light for forming a pit).

8. The information recording method according to claim 5,
wherein said peak detecting step includes a step of deriving the level Spk by using an equation $Spk=Ss/Pr1 \times Pw1$ or an equation $Spk \times \alpha = Ss/Pr1 \times Pw1$ (where Ss represents a level of a portion of a reflection light from said optical disk in case of a pit not being formed, in which portion a light intensity is stable, and Pr1 represents a power of a laser light for forming no pit).

9. The information recording method according to claim 6,
wherein said peak detecting step includes a step of deriving the level Spk by using an equation $Spk=Ss/Pr1 \times Pw1$ or an equation $Spk \times \alpha = Ss/Pr1 \times Pw1$ (where Pr1 represents a power of a laser light for forming no pit, and Pw1 represents a power of a laser light for forming a pit).

10. The information recording method according to claim 1,
wherein said condition detecting step includes a step of deriving said condition index Rm by using an equation $Rm=(Sp/Rp)/Ss/(Pw1/Rp)^\gamma$ (where Rp represents a ratio of power changes due to changes in a velocity along tracks of said optical disk), in a case where a rotation velocity of said optical disk is constant.

11. The information recording method according to claim 2,
wherein said condition detecting step includes a step of deriving said condition index Rm by using an equation $Rm=(Sp/Rp)/Ref/(Pw1/Rp)^\gamma$ (where Rp represents a ratio of power changes due to changes in a velocity along tracks of said optical disk), in a case where a rotation velocity of said optical disk is constant.

12. The information recording method according to claim 3,
wherein said condition detecting step includes a step of deriving said detection index Rm by using an equation $Rm=(Sp/Rp)/(Pw1/Rp)^\gamma$ (where Rp represents a ratio of power changes due to changes in a velocity along tracks of said optical disk), in a case where a rotation velocity of said optical disk is constant.

13. The information recording method according to claim 4,
wherein said condition detecting step includes a step of deriving said condition index Rm by using an equation $Rm=Spk \times \alpha \times \gamma - Sp/Rp) \times Pw1/Rp$ (where Rp represents a ratio of power changes due to changes in a velocity along tracks of said optical disk), in a case where a rotation velocity of said optical disk is constant.

14. The information recording method according to claim 5,
wherein said condition detecting step includes a step of deriving said condition index Rm by using an equation $Rm=(Spk \times \alpha \times \gamma - Sp/Rp) \times Pw1/Rp$ (where Rp represents a ratio of power changes due to changes in a velocity along tracks of said optical disk), in a case where a rotation velocity of said optical disk is constant.

15. The information recording method according to claim 6,
wherein said condition detecting step includes a step of deriving said condition index Rm by using an equation $Rm=(Spk \times \alpha \times \gamma - Sp/Rp)/Ss$ (where Rp represents a ratio of power changes due to changes in a velocity along tracks of said optical disk), in a case where a rotation velocity of said optical disk is constant.

16. The information recording method according to claim 13,
wherein said peak detecting step includes a step of deriving the level Spk by using an equation $Spk=Ss/Pr1 \times (Pw1/Rp)$ or an equation $Spk \times \alpha = Ss/Pr1 \times (Pw1/Rp)$, in the case where the rotation velocity of said optical disk is constant.

17. The information recording method according to claim 14,
wherein said peak detecting step includes a step of deriving the level Spk by using an equation $Spk=Ss/Pr1 \times (Pw1/Rp)$ or an equation $Spk \times \alpha = Ss/Pr1 \times (Pw1/Rp)$, in the case where the rotation velocity of said optical disk is constant.

18. The information recording method according to claim 15,
wherein said peak detecting step includes a step of deriving the level Spk by using an equation $Spk=Ss/Pr1 \times (Pw1/Rp)$ or an equation $Spk \times \alpha = Ss/Pr1 \times (Pw1/Rp)$, in the case where the rotation velocity of said optical disk is constant.

19. The information recording method according to claim 10,
wherein said condition detecting step includes a step of deriving the power change ratio Rp by using an equation $Rp=\epsilon \times \sqrt{Lv}$ (where $\epsilon$ represents a proportionality constant, and Lv represents a velocity along tracks of said optical disk), in a case where a recording strategy is not changed.

20. The information recording method according to claim 10,
wherein in a case where a recording strategy is changed, said condition detecting step includes a step of deriving the power change ratio Rp by using an equation $Rp=\epsilon \times \sqrt{Lv} \times Rps$ (where $\epsilon$ represents a proportionality constant, Lv represents a velocity along tracks of said optical disk, and Rps represents a ratio of power changes due to changes in said recording strategy).

21. The information recording method according to claim 1,
wherein in a case where said coefficient $\gamma$ can be represented by an expression $\gamma \approx f/g$ (where f and g are integers), said condition detecting step includes a step of deriving a value obtained by raising said condition index Rm to the g-th power, as an index which represents said recording condition of said optical disk.

22. The information recording method according to claim 1,
wherein said condition detecting step includes a step of deriving an average of values of said condition index Rm, which can be derived while said optical disk makes at least one rotation, as an index representing said recording condition of said optical disk.

* * * * *